United States Patent
Powell et al.

(10) Patent No.: US 9,447,345 B2
(45) Date of Patent: Sep. 20, 2016

(54) LIGNOCELLULOSIC BIOMASS CONVERSION

(71) Applicant: Shell Oil Company, Houston, TX (US)

(72) Inventors: Joseph Broun Powell, Houston, TX (US); John Anthony Smegal, Houston, TX (US)

(73) Assignee: Shell Oil Company, Houston, TX (US)

( * ) Notice: Subject to any disclaimer, the term of this patent is extended or adjusted under 35 U.S.C. 154(b) by 372 days.

(21) Appl. No.: 14/045,190

(22) Filed: Oct. 3, 2013

(65) Prior Publication Data

US 2014/0109464 A1    Apr. 24, 2014

Related U.S. Application Data

(60) Provisional application No. 61/710,921, filed on Oct. 8, 2012.

(51) Int. Cl.
*C07C 1/00* (2006.01)
*C10L 1/18* (2006.01)
*C10G 3/00* (2006.01)

(52) U.S. Cl.
CPC .............. *C10L 1/1802* (2013.01); *C10G 3/42* (2013.01); *C10G 3/50* (2013.01); *Y02E 50/343* (2013.01); *Y02P 30/20* (2015.11); *Y02T 50/678* (2013.01)

(58) Field of Classification Search
CPC .................... C10L 1/1802; C10L 2200/0469; C10L 2290/00
USPC .............................. 585/240; 44/307
See application file for complete search history.

(56) References Cited

U.S. PATENT DOCUMENTS

| | | | |
|---|---|---|---|
| 3,747,416 A | 7/1973 | Wommack | |
| 4,086,158 A | 4/1978 | McIlvried et al. | |
| 4,925,554 A | 5/1990 | Sato et al. | |
| 5,421,840 A | 6/1995 | Taylor et al. | |
| 8,729,324 B2* | 5/2014 | Powell | C10G 3/00 435/166 |
| 8,729,325 B2* | 5/2014 | Powell | C10G 3/00 585/240 |
| 8,846,993 B2* | 9/2014 | Powell | C10G 3/00 127/37 |
| 9,102,878 B2* | 8/2015 | Powell | C10G 1/00 |
| 9,102,879 B2* | 8/2015 | Powell | C10G 3/00 |
| 2009/0163744 A1 | 6/2009 | Abhari et al. | |
| 2011/0282115 A1* | 11/2011 | Chheda | C10G 3/42 585/240 |
| 2012/0151827 A1 | 6/2012 | Powell et al. | |
| 2012/0152836 A1* | 6/2012 | Powell | C07G 1/00 210/620 |
| 2012/0156742 A1* | 6/2012 | Powell | C10G 3/00 435/155 |
| 2012/0156743 A1* | 6/2012 | Powell | C10G 3/00 435/155 |
| 2013/0152456 A1 | 6/2013 | Powell | |
| 2013/0158308 A1 | 6/2013 | Powell | |
| 2014/0005444 A1* | 1/2014 | Komplin | C07C 29/132 568/861 |
| 2014/0096764 A1* | 4/2014 | Komplin | C08B 1/00 127/1 |

OTHER PUBLICATIONS

Scott E. Denmark and Gregory L. Beutner, Lewis Base Catalysis in Organic Synthesis, Angew. Chem. Int. Ed. 2008, 47, 1560-1638.

(Continued)

*Primary Examiner* — Ellen McAvoy

(57) ABSTRACT

A partially digested biomass solids is converted in a fixed bed catalytic reduction reactor under hydrothermal catalytic condition with a supported metal catalyst having a high void fraction. The catalyst having high void fraction allows high permeability and extends reaction run time.

22 Claims, 4 Drawing Sheets

(56) References Cited

OTHER PUBLICATIONS

K. Tanabe, M. Misono, Y. Ono, H. Hattori (Eds.), New Solid Acids and Bases, Kodansha/Elsevier, Tokyo/Amsterdam, 1989, pp. 260-267.

Machado, R. et al.; "Applying Monolith Reactors for Hydrogenations in the Production of Specialty Chemicals-Process and Economic Considerations"; Catalysis today; vol. 205; pp. 305-317; 2005.

* cited by examiner

LIGNOCELLULOSIC BIOMASS CONVERSION

RELATED APPLICATIONS

This application claims the benefit of U.S. Provisional Application No. 61/710,921, filed on Oct. 8, 2012, the disclosure of which is incorporated herein by reference in its entirety.

TECHNICAL FIELD

This disclosure relates to lignocellulosic biomass conversions process for the production of higher hydrocarbons suitable for use in transportation fuels and industrial chemicals from biomass, more specifically to the use of a high void fraction supported metal catalyst for the conversion of lignocellulosic biomass.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of any prior art.

A number of substances of commercial significance may be produced from natural sources, particularly biomass. Cellulosic biomass may be particularly advantageous in this regard due to the versatility of the abundant carbohydrates found therein in various forms. As used herein, the term "cellulosic biomass" refers to a living or recently living biological material that contains cellulose. The lignocellulosic material found in the cell walls of higher plants is the world's most abundant source of carbohydrates. Materials commonly produced from cellulosic biomass may include, for example, paper and pulpwood via partial digestion, and bioethanol by fermentation.

Plant cell walls are divided into two sections: primary cell walls and secondary cell walls. The primary cell wall provides structural support for expanding cells and contains three major polysaccharides (cellulose, pectin, and hemicellulose) and one group of glycoproteins. The secondary cell wall, which is produced after the cell has finished growing, also contains polysaccharides and is strengthened through polymeric lignin that is covalently crosslinked to hemicellulose. Hemicellulose and pectin are typically found in abundance, but cellulose is the predominant polysaccharide and the most abundant source of carbohydrates. The complex mixture of constituents that is co-present with the cellulose can make its processing difficult, as discussed hereinafter. Lignocellulosic biomass refers to plant biomass that is composed of cellulose, hemicellulose, and lignin.

Significant attention has been placed on developing fossil fuel alternatives derived from renewable resources. Cellulosic biomass has garnered particular attention in this regard due to its abundance and the versatility of the various components found therein, particularly cellulose and other carbohydrates. Despite promise and intense interest, the development and implementation of bio-based fuel technology has been slow. Existing technologies have heretofore produced fuels having a low energy density (e.g., bioethanol) and/or that are not fully compatible with existing engine designs and transportation infrastructure (e.g., methanol, biodiesel, Fischer-Tropsch diesel, hydrogen, and methane). Energy- and cost-efficient processes for processing cellulosic biomass into fuel blends having similar compositions to fossil fuels would be highly desirable to address the foregoing issues and others.

When converting cellulosic biomass into fuel blends and other materials, cellulose and other complex carbohydrates therein can be extracted and transformed into simpler organic molecules, which can be further reformed thereafter. Fermentation is one process whereby complex carbohydrates from cellulosic biomass may be converted into a more usable form. However, fermentation processes are typically slow, require large volume reactors and high dilution conditions, and produce an initial reaction product having a low energy density (ethanol). Digestion is another way in which cellulose and other complex carbohydrates may be converted into a more usable form. Digestion processes can break down cellulose and other complex carbohydrates within cellulosic biomass into simpler, soluble carbohydrates that are suitable for further transformation through downstream reforming reactions. As used herein, the term "soluble carbohydrates" refers to monosaccharides or polysaccharides that become solubilized in a digestion process. Although the underlying chemistry is understood behind digesting cellulose and other complex carbohydrates and further transforming simple carbohydrates into organic compounds reminiscent of those present in fossil fuels, high-yield and energy-efficient digestion processes suitable for converting cellulosic biomass into fuel blends have yet to be developed. In this regard, the most basic requirement associated with converting cellulosic biomass into fuel blends using digestion and other processes is that the energy input needed to bring about the conversion should not be greater than the available energy output of the product fuel blends. This basic requirement leads to a number of secondary issues that collectively present an immense engineering challenge that has not been solved heretofore.

The issues associated with converting cellulosic biomass into fuel blends in an energy- and cost-efficient manner using digestion are not only complex, but they are entirely different than those that are encountered in the digestion processes commonly used in the paper and pulpwood industry. Since the intent of cellulosic biomass digestion in the paper and pulpwood industry is to retain a solid material (e.g., wood pulp), incomplete digestion is usually performed at low temperatures (e.g., less than about 100 degrees C.) for a fairly short period of time. In contrast, digestion processes suitable for converting cellulosic biomass into fuel blends and other materials are ideally configured to maximize yields by solubilizing as much of the original cellulosic biomass charge as possible in a high-throughput manner.

Production of soluble carbohydrates for use in fuel blends and other materials via routine modification of paper and pulpwood digestion processes is not believed to be economically feasible for a number of reasons. Simply running the digestion processes of the paper and pulpwood industry for a longer period of time to produce more soluble carbohydrates is undesirable from a throughput standpoint. Use of digestion promoters such as strong alkalis, strong acids, or sulfites to accelerate the digestion rate can increase process costs and complexity due to post-processing separation steps and the possible need to protect downstream components from these agents. Accelerating the digestion rate by increasing the digestion temperature can actually reduce yields due to thermal degradation of soluble carbohydrates that can occur at elevated digestion temperatures, particularly over extended periods of time. Once produced by digestion, soluble carbohydrates are very reactive and can rapidly degrade to produce caramelans and other heavy ends degradation products, especially under higher temperature conditions, such as above about 150 degrees C. Use of higher digestion temperatures can also be undesirable from an energy efficiency standpoint. Any of these difficulties can defeat the economic viability of fuel blends derived from cellulosic biomass.

One way in which soluble carbohydrates can be protected from thermal degradation is through subjecting them to one or more catalytic reduction reactions, which may include hydrogenation and/or hydrogenolysis reactions. Stabilizing soluble carbohydrates through conducting one or more catalytic reduction reactions may allow digestion of cellulosic biomass to take place at higher temperatures than would otherwise be possible without unduly sacrificing yields. Depending on the reaction conditions and catalyst used, reaction products formed as a result of conducting one or more catalytic reduction reactions on soluble carbohydrates may include triols, diols, monohydric alcohols, or any combination thereof, some of which may also include a residual carbonyl functionality (e.g., an aldehyde or ketone). Such reaction products may be more thermally stable than soluble carbohydrates and are readily transformable into fuel blends and other materials through conducting one or more downstream reforming reactions. In addition, the foregoing types of reaction products are good solvents in which a hydrothermal digestion may be performed, thereby promoting solubilzation of soluble carbohydrates as their reaction products and cellulosic biomass components such as lignin, for example.

Another issue associated with the processing of cellulosic biomass into fuel blends and other materials is created by the need for high conversion percentages of a cellulosic biomass charge into soluble carbohydrates. Specifically, as cellulosic biomass solids are digested, their size gradually decreases to the point that they can become fluidly mobile. As used herein, cellulosic biomass solids that are fluidly mobile, particularly cellulosic biomass solids that are about 3 mm in size or less, will be referred to as "cellulosic biomass fines." Cellulosic biomass fines can be transported out of a digestion zone of a system for converting cellulosic biomass and into one or more zones where solids are unwanted and can be detrimental. For example, cellulosic biomass fines have the potential to plug catalyst beds, transfer lines, and the like. Furthermore, although small in size, cellulosic biomass fines may represent a non-trivial fraction of the cellulosic biomass charge, and if they are not further converted into soluble carbohydrates, the ability to attain a satisfactory conversion percentage may be impacted. Since the digestion processes of the paper and pulpwood industry are run at relatively low cellulosic biomass conversion percentages, smaller amounts of cellulosic biomass fines are believed to be generated and have a lesser impact on those digestion processes.

In addition to the desired carbohydrates, other materials may be present within cellulosic biomass that can be especially problematic to deal with in an energy- and cost-efficient manner. Sulfur- and/or nitrogen-containing amino acids or other catalyst poisons may be present in cellulosic biomass. If not removed, these catalyst poisons can impact the catalytic reduction reaction(s) used to stabilize soluble carbohydrates, thereby resulting in process downtime for catalyst regeneration and/or replacement and reducing the overall energy efficiency when restarting the process. On the other hand, in-process removal of these catalyst poisons can also impact the energy efficiency of the biomass conversion process, since the ion-exchange processes typically needed to affect their removal are usually conducted at temperatures below those at which soluble carbohydrates are produced by digestion, thereby introducing heat exchange operations that add to design complexity and may increase operational costs. In addition to catalyst poisons, lignin, which is a non-cellulosic biopolymer, may become solubilized in conjunction with the production of soluble carbohydrates. If not addressed in some manner, lignin concentrations may become sufficiently high during biomass conversion that precipitation eventually occurs, thereby resulting in costly system downtime. In the alternative, some lignin may remain unsolubilized, and costly system downtime may eventually be needed to affect its removal.

As evidenced by the foregoing, the efficient conversion of cellulosic biomass into fuel blends is a complex problem that presents immense engineering challenges. The present disclosure addresses these challenges and provides related advantages as well.

SUMMARY

In an embodiment, there is provided a lignocellulosic biomass conversion method comprising: (a) providing a solid biomass feedstock containing cellulose, lignin and water in a hydrothermal digestion unit; (b) heating the solid biomass feedstock in the hydrothermal digestion unit in the presence of a liquor to digest at least a portion of the solid biomass feedstock, thereby forming a hydrolysate comprising partially digested solids and soluble carbohydrates within a liquor phase; (c) contacting at least a portion of the hydrolysate, in one or more first fixed bed catalytic reduction reactor units, with molecular hydrogen at a temperature in the range of 180 degrees C. to less than 300 degrees C. in the presence of a supported metal catalyst capable of activating molecular hydrogen having an average void fraction of at least 40% and a surface area in the range of 10 $m^2/g$ to 1000 $m^2/g$, thereby at least partially transforming the hydrolysate into a reaction product comprising one or more alcohols in the liquor phase in the one or more first fixed bed catalytic reduction reactor units; (d) recirculating at least a portion of the liquor phase and at least a portion of the partially digested solids from the one or more first fixed bed catalytic reduction reactor units to the hydrothermal digestion unit; and (e) transferring at least a portion of the reaction product to a second catalytic reduction reactor unit so as to further transform the soluble carbohydrates into a reaction product.

In another embodiment, a composition is provided comprising: (i) lignocellulosic biomass; (ii) a supported metal catalyst having a void fraction in the range of from 45% to 95% and a surface area in the range of 10 $m^2/g$ to 1000 $m^2/g$ containing (a) Mo or W, and (b) Co, Ni or mixture thereof; (iii) water; and (iv) a liquor phase.

In yet another embodiment, there is provided a lignocellulosic biomass conversion system comprising: a hydrothermal digestion unit; a first catalytic reduction reactor unit fluidly coupled to the hydrothermal digestion unit along its height by two or more fluid inlet lines and two or more fluid return lines, the first catalytic reduction reactor unit containing a supported metal catalyst capable of activating molecular hydrogen having a void fraction of at least 45% and a surface area in the range of 10 $m^2/g$ to 1000 $m^2/g$; and a fluid circulation loop comprising the hydrothermal digestion unit and a second catalytic reduction reactor unit that contains a catalyst capable of activating molecular hydrogen.

Other advantages and features of embodiments of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The drawings illustrate certain aspects of some of the embodiments of the invention, and should not be used to limit or define the invention.

DETAILED DESCRIPTION

Figure 1:
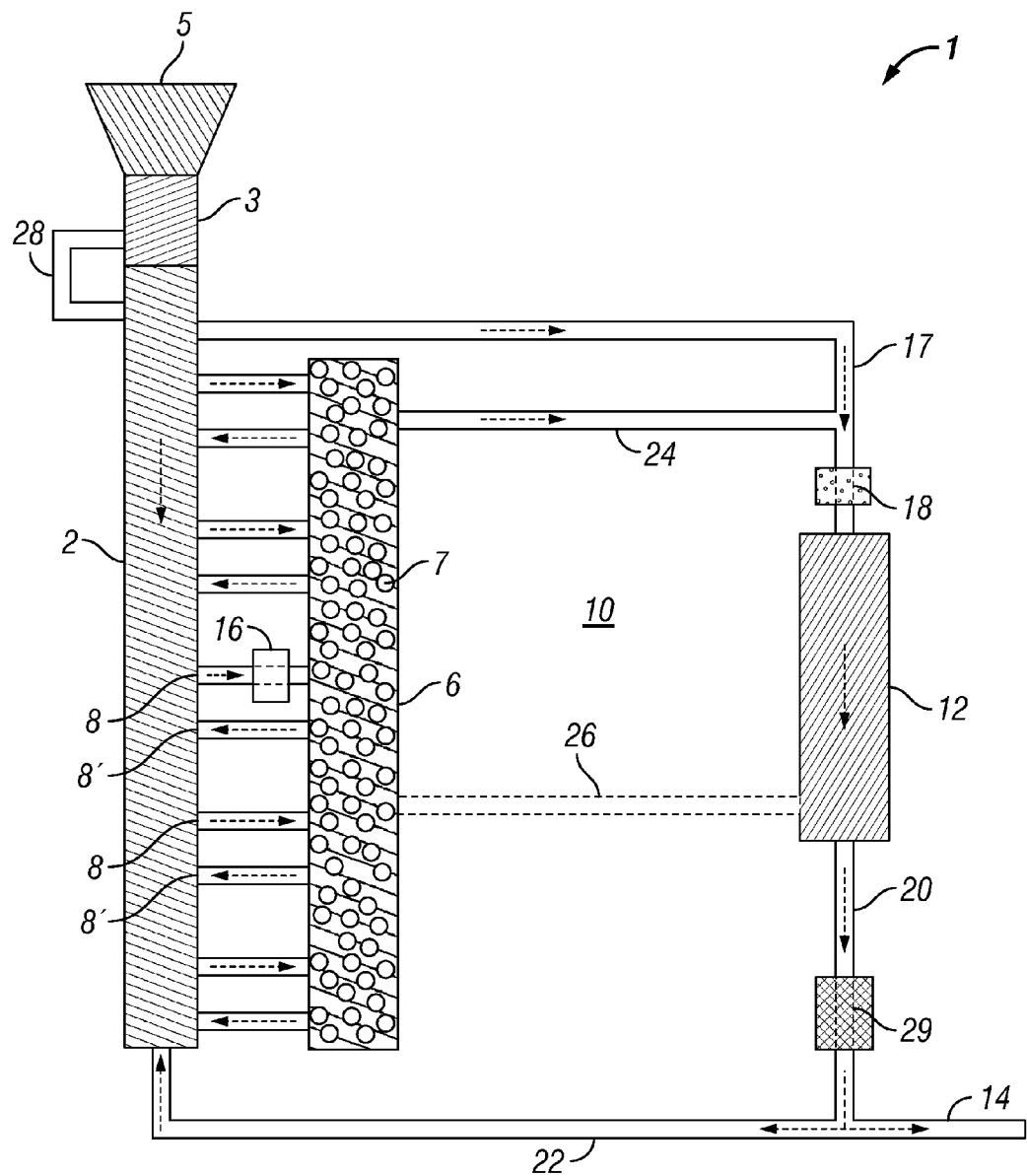
FIG. 1 is a schematically illustrated block flow diagram of an embodiment of the biomass conversion process having a catalytic reduction reactor unit containing the high void fraction catalyst, fluidly coupled to a hydrothermal digestion unit at various points along its height.

The present disclosure provides systems and methods that allow lignocellulosic cellulosic biomass solids that contains cellulose and lignin to be efficiently digested to form soluble carbohydrates, which may subsequently be converted through one or more catalytic reduction reactions (e.g., hydrogenolysis and/or hydrogenation) into more stable reaction products comprising oxygenated intermediates that may be further processed into higher hydrocarbons. In embodiments provided herein, the digestion rate of cellulosic biomass may be accelerated in the presence of a liquor (digestive solvent) at elevated temperatures and pressures that maintain the liquor in a liquid state above its normal boiling point. The more rapid rate of digestion may be desirable from the standpoint of throughput, but soluble carbohydrates may be susceptible to degradation under these conditions, as discussed in more detail hereinafter. It was found that it is desirable to have the liquor that is at least in part in-situ generated as the digestive solvent, which may provide certain advantages, as described hereinafter. In such a system some portion of the partially digested solids may clog the pores of the catalyst as the hydrolysate that comprises partially digested solids and soluble carbohydrates within a liquor phase is contacted with the fixed bed supported metal catalyst. It has been found that a supported metal catalyst capable of activating molecular hydrogen having an average void fraction of at least 40% (high void fraction) and a surface area in the range of 10 m$^2$/g to 1000 m$^2$/g allows high permeability and extends reaction run time in the first fixed bed catalytic reduction reactor units.

Void fraction is a measure of the void (i.e., "empty") spaces in a material, and is a fraction of the volume of voids over the total volume, as a percentage between 0-100%. For porous materials such as the high void fraction supported metal catalyst herein, mercury pycnometry is recognized as the benchmark method for density determination (such as U.S. Pat. No. 3,747,416: Density measurement apparatus. Wommack W. C, 1973). Mercury is an excellent displacement liquid—its high wetting angle and large surface tension prevents it from penetrating into the small pores in porous materials.

In the mercury pycnometry method a quantity of a dry, pre-weighed catalyst sample is placed into the penetrometer. The weight of the penetrometer filled with mercury is first determined, as is the weight of the penetrometer. The penetrometer with sample is evacuated and filled with mercury. Mercury surrounds the sample, but, at sub-ambient or near-ambient pressure, does not enter small cracks and crevices in the surface nor into pores in the structure of the material. From the weight of the penetrometer+sample+Hg, the weight of the penetrometer+Hg without the sample and the weight of the empty penetrometer, one can determine the weight of Hg corresponding to the volume of the catalyst sample. Knowing the density of the mercury yields the volume of the catalyst sample. Dividing the measured sample weight by the volume of the sample determined by mercury displacement gives the particle density, ρparticle, of the catalyst.

The void fraction, Φ, is determined by:

$$\Phi = 1 - (\rho bulk / \rho particle) \qquad \text{(equation 1)}$$

where ρbulk is the compacted bulk density of the sample.

The higher hydrocarbons may be useful in forming industrial chemicals and transportation fuels (i.e., a biofuel), including, for example, synthetic gasoline, diesel fuels, jet fuels, and the like. As used herein, the term "biofuel" will refer to any transportation fuel formed from a biological source. Such biofuels may also be referred to herein as "fuel blends." In particular, the systems and methods described herein contain one or more catalytic reduction reactor units containing the high void fraction supported metal catalyst that are fluidly coupled in parallel to a hydrothermal digestion unit, thereby allowing a hydrolysate comprising soluble carbohydrates to be efficiently transformed into a more stable reaction product before significant degradation has time to take place.

As used herein, the term "oxygenated intermediates" refers to alcohols, polyols, ketones, aldehydes, and mixtures thereof that are produced from a catalytic reduction reaction (e.g., hydrogenolysis and/or hydrogenation) of soluble carbohydrates. As used herein, the term "higher hydrocarbons" refers to hydrocarbons having an oxygen to carbon ratio less than that of at least one component of the biomass source from which they are produced. As used herein, the term "hydrocarbon" refers to an organic compound comprising primarily hydrogen and carbon, although heteroatoms such as oxygen, nitrogen, sulfur, and/or phosphorus may be present in some embodiments. Thus, the term "hydrocarbon" also encompasses heteroatom-substituted compounds containing carbon, hydrogen, and oxygen, for example.

When a digestion solvent (or liquor) is used at high temperatures and pressures in a hydrothermal digestion, the digestion process may become fairly energy intensive. If the energy input requirements for the digestion process become too great, the economic feasibility of cellulosic biomass as a feedstock material may be jeopardized. That is, if the energy input needed to digest cellulosic biomass becomes too great, processing costs may become higher than the actual value of the product being generated. In order to keep processing costs low, the amount of externally added heat input to the digestion process should be kept as low as possible while achieving as high as possible conversion of the cellulosic biomass into soluble carbohydrates, which can subsequently be transformed into a more stable reaction product.

In the embodiments described herein, the hydrolysate may be transferred to one or more catalytic reduction reactor units containing the high void fraction supported metal catalyst, such catalytic reduction reactor units are fluidly coupled to the hydrothermal digestion unit, such that the soluble carbohydrates may be at least partially transformed into a stabilized reaction product as quickly as possible. Once the soluble carbohydrates have been at least partially transformed into a reaction product, completion of the conversion of the soluble carbohydrates into a reaction product may take place in a second catalytic reduction reactor unit. The described biomass conversion system features can allow a significant quantity of the initially solubilized carbohydrates to be converted into a form that is suitable for subsequent processing into a biofuel, while forming as small as possible an amount of caramelans and other decomposition products in or near the hydrothermal digestion unit.

A leading advantage of the biomass conversion systems and methods described herein is that the systems and methods are configured to rapidly stabilize a significant fraction of the hydrolysate produced therein. In one embodiment of the biomass conversion systems described herein, at least partial stabilization of the hydrolysate may be accomplished by rapidly recirculating the hydrolysate to one or more first catalytic reduction reactor units that are directly coupled (i.e., fluidly coupled) to the hydrothermal digestion unit. The one or more first catalytic reduction reactor units contain molecular hydrogen and a supported metal catalyst that is capable of activating molecular hydrogen (also referred to herein as "hydrogen-activating supported metal catalysts") that has high void fraction. By reacting the hydrolysate in the first catalytic reduction reactor unit(s), an initial, at least partial conversion of the hydrolysate from unstable, soluble carbohydrates into a reaction product comprising more stable oxygenated intermediates can be accomplished. The high void fraction supported metal catalyst allows permeability to the hydrolysate that contains partially digested solid biomass and extends the catalyst run life. Without wishing to be bound by theory, it is thought that the high void fraction allows more flows through the catalyst system and allows more digestion to smaller particles and/or allows cellulosic biomass fines and/or partially digested biomass solids to recirculate with the fluid. The initial reaction product may then be recirculated to the hydrothermal digestion unit along with biomass fines or partially digested biomass solids and thereafter be recirculated to the first catalytic reduction reactor unit(s) and/or circulated to a second catalytic reduction reactor unit to form a further transformed reaction product that is more amenable to being transformed into a biofuel. The transformation that takes place in the second catalytic reduction reactor unit may comprise a further reduction in the degree of oxidation of the initial reaction product, an increased conversion of soluble carbohydrates into oxygenated intermediates, or both. The reaction product obtained from the second catalytic reduction reactor unit may be recirculated to the hydrothermal digestion unit and/or be withdrawn for subsequent conversion into a biofuel or other material. By at least partially transforming the soluble carbohydrates into a reaction product before the hydrolysate reaches the second catalytic reduction reactor unit, demands thereon may be lessened, and it may be possible to realize a higher conversion of soluble carbohydrates into the reaction product than would otherwise be possible.

By fluidly coupling the one or more first catalytic reduction reactor units containing the high void fraction catalyst to the hydrothermal digestion unit, excellent heat integration efficiency may be realized with extended run life. Reaction product that is recirculated to the hydrothermal digestion unit from either catalytic reduction reactor unit may transfer the excess heat produced therein to the hydrothermal digestion unit in order to drive the endothermic digestion process. The input of what would otherwise constitute waste heat may lessen the need to input additional energy into the digestion process, thereby potentially lowering processing costs. Further, since the soluble carbohydrates have been at least partially transformed into a reaction product prior to reaching the second catalytic reduction reactor unit, the demands thereon may be lessened, thereby potentially allowing a smaller reactor unit to be used than would otherwise be possible. In addition, since a high amount of heat integration efficiency may be realized by recirculating reaction product from the first catalytic reduction reactor unit(s), there may be a reduced need to recirculate reaction product from the second catalytic reduction reactor unit in order to maintain an energy efficient process. Thus, lower reaction product recycle ratios may be used, and a greater fraction of the reaction product may be withdrawn from the second catalytic reduction reactor unit for subsequent conversion into a biofuel or other materials. The foregoing factors may also reduce capital and operational costs associated with the biomass conversion systems.

In further regard to heat integration efficiency, certain embodiments of the present biomass conversion systems may also be advantageous, since the hydrothermal digestion unit in the systems can be continuously operated at elevated temperatures and pressures, in some embodiments. Continuous, high temperature hydrothermal digestion may be accomplished by configuring the biomass conversion systems such that fresh biomass may be continuously or semi-continuously supplied to the hydrothermal digestion unit while it operates in a pressurized state. That is, certain embodiments of the biomass conversion systems may be configured such that biomass may be added to a pressurized hydrothermal digestion unit. Without the ability to introduce fresh biomass to a pressurized hydrothermal digestion unit, depressurization and cooling of the hydrothermal digestion unit may take place during biomass addition, significantly reducing the energy- and cost-efficiency of the conversion process. As used herein, the term "continuous addition" and grammatical equivalents thereof will refer to a process in which biomass is added to a hydrothermal digestion unit in an uninterrupted manner without fully depressurizing the hydrothermal digestion unit. As used herein, the term "semi-continuous addition" and grammatical equivalents thereof will refer to a discontinuous, but as-needed, addition of biomass to a hydrothermal digestion unit without fully depressurizing the hydrothermal digestion unit. A further description of biomass feed mechanisms that may supply biomass to a pressurized hydrothermal digestion unit are described in more detail below.

The biomass conversion systems and associated methods described herein are to be further distinguished from those of the paper and pulpwood industry, where the goal is to harvest partially digested wood pulp, rather than obtaining as high as possible a quantity of soluble carbohydrates, which can be subsequently converted into a reaction product comprising oxygenated intermediates. Since the goal of paper and pulpwood processing is to obtain raw wood pulp, such digestion processes may be conducted at lower temperatures and pressures to remove lower quantities of soluble carbohydrates and non-cellulosic components from the biomass, which can be removed at lower temperatures. In some embodiments described herein, at least about 60% of the cellulosic biomass, on a dry basis, may be digested to produce a hydrolysate comprising soluble carbohydrates. In other embodiments described herein, at least about 90% of the cellulosic biomass, on a dry basis, may be digested to produce a hydrolysate comprising soluble carbohydrates. Given the intent of paper and pulpwood processing, it is anticipated that much lower quantities of soluble carbohydrates are produced in these processes. The design of the present systems may enable high conversion rates by minimizing the formation of degradation products during the processing of biomass, while maintaining long residence times during hydrothermal digestion.

Although fluid coupling one or more catalytic reduction reactor units directly to a hydrothermal digestion unit may prove advantageous, as described above, such an approach is not without difficulty. Cellulosic biomass, particularly cellulosic biomass fines and/or partially digested biomass solids, may circulate from the hydrothermal digestion unit to the fluidly coupled catalytic reduction reactor unit(s) and result in catalyst plugging therein. This issue can be particularly problematic for the fixed bed catalysts that are commonly used in conjunction with performing catalytic reduction reactions.

Unless otherwise specified herein, it is to be understood that use of the terms "biomass" or "lignocellulosic biomass" or "cellulosic biomass" in the description herein refers to "lignocellulosic biomass solids." Solids may be in any size, shape, or form. The lignocellulosic biomass solids may be natively present in any of these solid sizes, shapes, or forms, or they may be further processed prior to digestion in the embodiments described herein. The cellulosic biomass solids may also be present in a slurry form in the embodiments described herein.

In practicing the present embodiments, any type of suitable biomass source may be used. Suitable cellulosic biomass sources may include, for example, forestry residues, agricultural residues, herbaceous material, municipal solid wastes, waste and recycled paper, pulp and paper mill residues, and any combination thereof. Thus, in some embodiments, a suitable lignocellulosic biomass may include, for example, corn stover, straw, bagasse, miscanthus, sorghum residue, switch grass, bamboo, water hyacinth, hardwood, hardwood chips, hardwood pulp, softwood, softwood chips, softwood pulp, and any combination thereof. Leaves, roots, seeds, stalks, husks, and the like may be used as a source of the cellulosic biomass. Common sources of cellulosic biomass may include, for example, agricultural wastes (e.g., corn stalks, straw, seed hulls, sugarcane leavings, nut shells, and the like), wood materials (e.g., wood or bark, sawdust, timber slash, mill scrap, and the like), municipal waste (e.g., waste paper, yard clippings or debris, and the like), and energy crops (e.g., poplars, willows, switch grass, alfalfa, prairie bluestream, corn, soybeans, and the like). The cellulosic biomass may be chosen based upon considerations such as, for example, cellulose and/or hemicellulose content, lignin content, growing time/season, growing location/transportation cost, growing costs, harvesting costs, and the like.

Illustrative carbohydrates that may be present in cellulosic biomass may include, for example, sugars, sugar alcohols, celluloses, lignocelluloses, hemicelluloses, and any combination thereof. Once soluble carbohydrates have been removed from the biomass matrix through a digestion process according to the embodiments described herein, the soluble carbohydrates may be transformed into a reaction product comprising oxygenated intermediates via a catalytic reduction reaction. In some embodiments, the oxygenated intermediates comprising the reaction product may be further transformed into a biofuel using any combination of further hydrogenolysis reactions, hydrogenation reactions, condensation reactions, isomerization reactions, oligomerization reactions, hydrotreating reactions, alkylation reactions, and the like. In some embodiments, at least a portion of the oxygenated intermediates may be recirculated to the hydrothermal digestion unit to comprise at least a portion of the digestion solvent. Recirculation of at least a portion of the oxygenated intermediates to the hydrothermal digestion unit may also be particularly advantageous in terms of heat integration and process efficiency.

In some embodiments, a lignocellulosic biomass conversion method described herein may comprise: (a) providing a solid biomass feedstock containing cellulose, lignin and water in a hydrothermal digestion unit; (b) heating the solid biomass feedstock in the hydrothermal digestion unit in the presence of a liquor to digest at least a portion of the solid biomass feedstock, thereby forming a hydrolysate comprising partially digested solids and soluble carbohydrates within a liquor phase; (c) contacting at least a portion of the hydrolysate, in one or more first fixed bed catalytic reduction reactor units, with molecular hydrogen at a temperature in the range of about 180 degrees C. to less than about 300 degrees C. in the presence of a supported metal catalyst capable of activating molecular hydrogen having an average void fraction of at least about 40% and a surface area in the range of about 10 $m^2/g$ to about 1000 $m^2/g$, thereby at least partially transforming the hydrolysate into a reaction product comprising one or more alcohols in the liquor phase in the one or more first fixed bed catalytic reduction reactor units; (d) recirculating at least a portion of the liquor phase and at least a portion of the partially digested solids from the one or more first fixed bed catalytic reduction reactor units to the hydrothermal digestion unit; and (e) transferring at least a portion of the reaction product to a second catalytic reduction reactor unit so as to further transform the soluble carbohydrates into a reaction product.

In some embodiments, such biomass conversion systems can comprise: a hydrothermal digestion unit; a first catalytic reduction reactor unit fluidly coupled to the hydrothermal digestion unit along its height, the first catalytic reduction reactor unit containing a high void fraction supported metal catalyst capable of activating molecular hydrogen; and a fluid circulation loop comprising the hydrothermal digestion unit and a second catalytic reduction reactor unit that contains a catalyst capable of activating molecular hydrogen.

In some embodiments, the biomass conversion system can comprise: a hydrothermal digestion unit; a first catalytic reduction reactor unit fluidly coupled to the hydrothermal digestion unit along its height by two or more fluid inlet lines and two or more fluid return lines, the first catalytic reduction reactor unit containing a high void fraction supported metal catalyst capable of activating molecular hydrogen; and a fluid circulation loop comprising the hydrothermal digestion unit and a second catalytic reduction reactor unit that contains a catalyst capable of activating molecular hydrogen.

In some embodiments, the biomass conversion system can comprise: a hydrothermal digestion unit; two or more first catalytic reduction reactor units fluidly coupled to the hydrothermal digestion unit along its height, each first catalytic reduction reactor unit being coupled to the hydrothermal digestion unit by a fluid inlet lines and a fluid return line and containing a high void fraction supported metal catalyst capable of activating molecular hydrogen; and a fluid circulation loop comprising the hydrothermal digestion unit and a second catalytic reduction reactor unit that contains a catalyst capable of activating molecular hydrogen.

In some embodiments, there may be a first catalytic reduction reactor unit coupled to the hydrothermal digestion unit by a plurality of fluid inlet lines and fluid return lines. In some embodiments, there may be an equal number of fluid inlet lines and fluid return lines. In other embodiments, there may be a greater number of fluid inlet lines than fluid return lines. In still other embodiments, there may be a greater number of fluid return lines than fluid inlet lines. As one of ordinary skill in the art will recognize, when the numbers of fluid inlet lines and fluid return lines are unequal, the fluid line type present in smaller number will have a larger size in order to maintain flow balance between the hydrothermal digestion unit and the first catalytic reduction reactor unit. In some embodiments, the fluid inlet lines may all be of the same size, and in other embodiments, at least some of them may be different. In some embodiments, the fluid return lines may all be of the same size, and in other embodiments, at least some of them may be different. In some embodiments, the fluid inlet lines and the fluid return lines may all be of the same size, and in other embodiments, at least some of the fluid lines may be of a different size than the fluid return lines.

The hydrogen-activating supported metal catalysts includes a support material that has incorporated therein or is loaded with a metal component, which is or can be converted to a metal compound that has activity towards activating molecular hydrogen. The support material can comprise any suitable inorganic oxide material that is typically used to carry catalytically active metal components. Examples of possible useful inorganic oxide materials include alumina, silica, silica-alumina, magnesia, zirconia, boria, titania and mixtures of any two or more of such inorganic oxides. The preferred inorganic oxides for use in the formation of the support material are alumina, silica, silica-alumina and mixtures thereof. Most preferred, however, is alumina. The shape of the hydrogen-activating supported metal catalysts is important for providing the high void fraction supported metal catalysts having a void fraction of at least at least about 40%, preferably at least about 45%, or at least about 50% or even at least about 60%. The void fraction may be as high as up to about 80%, or even up to about 95%. The surface area (determined by the BET method employing $N_2$, ASTM test method D 3037) of the hydrogen-cativating supported metal catalyst is preferably in the range of about 10 $m^2/g$ to about 1000 $m^2/g$. The void fraction may be as high as up to about 1000 $m^2/g$, preferably up to about 500 $m^2/g$, or more preferably up to about 400 $m^2/g$. In some embodiments, the surface area may be as low as about 10 $m^2/g$, preferably from about 50 $m^2/g$ more preferably from about 75 $m^2/g$, from about 100 $m^2/g$ or even higher than from about 150 $m^2/g$. In some embodiments, the surface area may be in the range of about 100 $m^2/g$ to about 350 $m^2/g$. The shapes may be hollow to provide more void fraction or may have groves or divets or lobes or nodes to provide more void fractions or any combinations. Such hollows and groves, divets or lobes or nodes can be one, two, three, four, five, six, or more such as in a monolithic catalyst structure (e.g., monolith or monolithic catalyst support/catalyst or honeycomb support/catalyst). For example, in some embodiments, suitable non-plugging catalysts may have a hole protruding through the catalyst particle, such that it has a higher effective surface area and produces a higher void fraction. In some or other embodiments, suitable non-plugging catalysts may comprise a catalytic coating on a surface such as, for example, a protruded metal packing. Illustrative examples of some of the catalyst shapes is provided in FIGS. 4A, 4B, 4C, 4D, 4E, 4F, 4G, 4H, 4I, 4J and 4K. These shapes are exemplary shapes and the support may contain more holes, irregularities, different hollow shapes, faces or thickness.

In the preparation of the hydrogen-activating supported metal catalysts for certain embodiments, the metal component of the catalyst composition may be incorporated into the support material by any suitable method or means that provides the support material that is loaded with an active metal precursor, thus, the composition includes the support material and a metal component. One method of incorporating the metal component into the support material, includes, for example, co-mulling the support material with the active metal or metal precursor to yield a co-mulled mixture of the two components. Or, another method includes the co-precipitation of the support material and metal component to form a co-precipitated mixture of the support material and metal component. Or, in a preferred method, the support material is impregnated with the metal component using any of the known impregnation methods such as incipient wetness to incorporate the metal component into the support material.

When using the impregnation method to incorporate the metal component into the support material, it is preferred for the support material to be formed into a shaped particle comprising an inorganic oxide material and thereafter loaded with an active metal precursor, preferably, by the impregnation of the shaped particle with an aqueous solution of a metal salt to give the support material containing a metal of a metal salt solution. To form the shaped particle, the inorganic oxide material, which preferably is in powder form, is mixed with water and, if desired or needed, a peptizing agent and/or a binder to form a mixture that can be shaped into an agglomerate. It is desirable for the mixture to be in the form of an extrudable paste suitable for extrusion into extrudate particles, which may be of various shapes such as described above. The support material of the inventive composition, thus, preferably, is a shaped particle comprising an inorganic oxide material capable of providing high void fraction in a dense packed bed.

The references herein to the pore size distribution and pore volume of the calcined shaped particle are to those properties as determined by mercury intrusion porosimetry, ASTM test method D 4284. The measurement of the pore size distribution of the calcined shaped particle is by any suitable measurement instrument using a contact angle of 140 degrees with a mercury surface tension of 474 dyne/cm at 25 degrees C.

In one embodiment, the calcined shaped particle is impregnated in one or more impregnation steps with a metal component using one or more aqueous solutions containing at least one metal salt wherein the metal compound of the metal salt solution is an active metal or active metal precursor. The hydrogen activating metal is preferably a molecular hydrogen activating transition metal, particularly those in the Group 6, 7, 8, 9 and/or 10 or combinations thereof, more preferably Mo, W, Co, Ni, Cr or a mixture thereof. In a preferred embodiment, metal elements are (a) molybdenum (Mo) and (b) cobalt (Co) and/or nickel (Ni).

Phosphorous (P) can also be a desired metal component. For Co and Ni, the metal salts include metal acetates, formats, citrates, oxides, hydroxides, carbonates, nitrates, sulfates, and two or more thereof. The preferred metal salts are metal nitrates, for example, such as nitrates of nickel or cobalt, or both. For Mo, the metal salts include metal oxides or sulfides. Preferred are salts containing the Mo and ammonium ion, such as ammonium heptamolybdate and ammonium dimolybdate.

In certain embodiments, phosphorus is an additive that may be incorporated in these catalysts. Phosphorus may be added to increase the solubility of the molybdenum and to allow stable solutions of cobalt and/or nickel with the molybdenum to be formed for impregnation. Without wishing to be bound by theory, it is thought that phosphorus may also promote hydrogenation and hydrodenitrogenation (HDN). The ability to promote HDN is an important one since nitrogen compounds are known inhibitors of the HDS reaction. The addition of phosphorus to these catalysts may increase the HDN activity and therefore increases the HDS activity as a result of removal of the nitrogen inhibitors from the reaction medium. The ability of phosphorus to also promote hydrogenation is also advantageous for HDS since some of the difficult, sterically hindered sulfur molecules are mainly desulfurized via an indirect mechanistic pathway that goes through an initial hydrogenation of the aromatic rings in these molecules. The promotion of the hydrogenation activity of these catalysts by phosphorus increases the desulfurization of these types of sulfur containing molecules. The phosphorus content of the finished catalyst is typically in a range from about 0.1 to 5.0 wt %.

The concentration of the metal compounds in the impregnation solution is selected so as to provide the desired metal content in the final composition of the hydrogen-activating supported metal catalyst taking into consideration the pore volume of the support material into which the aqueous solution is to be impregnated. Typically, the concentration of metal compound in the impregnation solution is in the range of from about 0.01 to 100 moles per liter.

Cobalt, nickel, or combination thereof can be present in the support material having a metal component incorporated therein in an amount in the range of from about 0.5 wt. % to about 20 wt. %, preferably from about 1 wt. % to about 15 wt. %, and, most preferably, from about 2 wt. % to about 12 wt. %, based on metals components (a) and (b) as metal oxide form; and the Molybdenum can be present in the support material having a metal component incorporated therein in an amount in the range of from about 2 wt. % to about 50 wt. %, preferably from about 5 wt. % to about 40 wt. %, and, most preferably, from about 12 wt. % to about 30 wt. %, based on metals components (a) and (b) as metal oxide form. The above-referenced weight percents for the metal components are based on the dry support material and the metal component as the element (change "element" to "metal oxide form") regardless of the actual form of the metal component.

Optionally, the metal loaded catalyst may be sulfided prior to its loading into a reactor vessel or system for its use as hydrogen-activating supported metal catalyst or may be sulfided, in situ, in a gas phase or liquid phase activation procedure. In one embodiment, the liquid soluble carbohydrate feedstock can be contacted with a sulfur-containing compound, which can be hydrogen sulfide or a compound that is decomposable into hydrogen sulfide, under the contacting conditions of the invention. Examples of such decomposable compounds include mercaptans, $CS_2$, thiophenes, dimethyl sulfide (DMS), dimethyl sulfoxide (DMSO), sodium hydrogen sulfate, and dimethyl disulfide (DMDS). Also, preferably, the sulfiding is accomplished by contacting the hydrogen treated composition, under suitable sulfurization treatment conditions, with a suitable feed-source that contains a concentration of a sulfur compound. The sulfur compound of the hydrocarbon feedstock can be an organic sulfur compound, particularly, one that is derived from the biomass feedstock or other sulfur containing amino-acids such as Cysteine.

Suitable sulfurization treatment conditions are those which provide for the conversion of the active metal components of the precursor hydrogen-activating supported metal catalyst to their sulfided form. Typically, the sulfiding temperature at which the precursor hydrogen-activating supported metal catalyst is contacted with the sulfur compound is in the range of from about 150 degrees C. to about 450 degrees C., preferably, from about 175 degrees C. to about 425 degrees C., and, most preferably, from about 200 degrees C. to about 400 degrees C.

When using a soluble carbohydrate feedstock that is to be treated using the catalyst to sulfide, the sulfurization conditions can be the same as the process conditions under which the hydrogen-activating supported metal is performed. The sulfiding pressure generally can be in the range of from about 1 bar to about 70 bar, preferably, from about 1.5 bar to about 55 bar, and, most preferably, from about 2 bar to about 35 bar. The resulting active catalyst typically has incorporated therein sulfur content in an amount in the range of from about 0.1 wt. % to about 40 wt. %, preferably from about 1 wt. % to about 30 wt. %, and, most preferably, from about 3 wt. % to about 24 wt. %, based on metals components (a) and (b) as metal oxide form.

In embodiments in which a first catalytic reduction reactor unit is coupled to the hydrothermal digestion unit, there may be one or more fluid inlet lines and one or more fluid return lines connecting the hydrothermal digestion unit and the first catalytic reduction reactor unit. In some embodiments, there may be two or more fluid inlet lines and two or more fluid return lines connecting the hydrothermal digestion unit and the first catalytic reduction reactor unit. In some embodiments, there may be between about 3 and about 10 pairs of fluid inlet lines and fluid return lines connecting the hydrothermal digestion unit and the first catalytic reduction reactor unit.

In some embodiments, the fluid inlet lines and the fluid return lines may be distributed uniformly along the height of the hydrothermal digestion unit. A uniform distribution of the fluid inlet lines and the fluid return lines can comprise, for example, an even spacing of the lines along the height of the hydrothermal digestion unit or an even spacing of the lines along a height of a region of the hydrothermal digestion unit. In other embodiments, the fluid inlet lines and the fluid return lines may be distributed non-uniformly along the height of the hydrothermal digestion unit. A non-uniform distribution of fluid inlet lines and fluid return lines can comprise, for example, a non-even spacing of the lines along the height of the hydrothermal digestion unit or a non-even spacing of the lines along a height of a region of the hydrothermal digestion unit. In some embodiments, the fluid inlet lines may be configured to remove hydrolysate from different regions of the hydrothermal digestion unit, where the regions may have varying thermal profiles. For example, in some embodiments, the fluid inlet lines may be configured to transfer hydrolysate to the first catalytic reduction reactor unit from a thermal region of the hydrothermal digestion unit where decomposition is more likely to take place (e.g., a higher temperature region), and the fluid return lines may be configured to return the reaction product to the hydrothermal digestion unit in the same thermal region or a different thermal region. In some embodiments, the fluid return lines may return the reaction product to a lower temperature thermal region compared to a higher temperature thermal region where the fluid inlet lines removed the hydrolysate.

In some embodiments, two or more first catalytic reduction reactor units may be coupled to the hydrothermal digestion unit, each first catalytic reduction reactor unit being coupled to the hydrothermal digestion unit along its height by a fluid inlet line and a fluid return line. Such a configuration may be used as an alternative to providing multiple fluid connections to a single first catalytic reduction reactor unit, thereby achieving a like result. In addition, use of multiple second catalytic reduction reactor units in lieu of a larger, single first catalytic reduction reactor unit may more readily facilitate the continuous processing of biomass using the biomass conversion systems. Specifically, during operation of the biomass conversion systems, it may be necessary to regenerate or replace the catalyst in the first catalytic reduction reactor unit(s). When only a single first catalytic reduction reactor unit is used, process downtime and startup may reduce the energy and cost efficiency of the conversion process when the system is taken offline to replace or regenerate the catalyst. In contrast, when multiple first catalytic reduction reactor units are used, one or more first catalytic reduction reactor units may be taken offline at a time, and the system can be allowed to maintain continuous operation with the remaining first catalytic reduction reactor units.

In some embodiments, there may be two or more first catalytic reduction reactor units coupled to the hydrothermal digestion unit. In some embodiments, there may be about 3 to about 10 first catalytic reduction reactor units coupled to the hydrothermal digestion unit along its height. In some embodiments, the first catalytic reduction reactor units may be distributed non-uniformly along the height of the hydrothermal digestion unit. Reasons for including a non-uniform distribution can include those described above in regard to the non-uniform distribution of fluid inlet lines and fluid outlet lines connecting the hydrothermal digestion unit and a single first catalytic reduction reactor unit. In other embodiments, the first catalytic reduction reactor units may be distributed uniformly along the height of the hydrothermal digestion unit. The hydrogen-activating supported metal catalyst may be the same or different in such first catalytic reduction reactor units.

In embodiments in which multiple first catalytic reduction reactor units are present, each first catalytic reduction reactor unit may have a fluid inlet line and a fluid return line connecting the hydrothermal digestion unit and the catalytic reduction reactor unit. In some embodiments, at least some of the first catalytic reduction reactor units may have more than one fluid inlet line, more than one fluid outlet line, or both.

It is contemplated that the void fraction within the catalytic reduction reactor units may not be uniform and can potentially be decreased downflow from the biomass inlet step wise or gradually. Such a configuration can be used to produce a backflushable bed, where the concentration of active catalyst increases in the direction of flow down the bed. The void fraction under operating conditions may decrease as a result of biomass particulates or other solids also present in the bed.

It has been found that sulfided cobalt-molybdate catalysts may give high yields of oxygenated intermediates while not forming an excess amount of C2-C4 alkanes in certain embodiments. The oxygenated intermediates formed may be readily separated from water via flash vaporization or liquid-liquid phase separation, and undergo condensation-oligomerization reactions in separate steps over an acid or base catalyst, to product liquid biofuels in the gasoline, jet, or diesel range.

In some embodiments, the catalytic reduction reactions carried out in the catalytic reduction reactor units may be hydrogenolysis reactions. A detailed description of hydrogenolysis reactions is included herein below.

In general, the catalytic reduction reactor units used in accordance with the embodiments described herein may be of any suitable type or configuration. In some embodiments, at least one of the catalytic reduction reactor units may comprise a fixed bed catalytic reactor such as, for example, a trickle bed catalytic reactor. For example, in some embodiments, the first catalytic reduction reactor unit may comprise a fixed bed catalytic reactor. In some embodiments, the second catalytic reduction reactor unit may comprise a reactor configuration such as, for example, a fixed bed catalytic reactor, a slurry bed catalytic reactor with filtration, a loop reactor, an upflow gas-liquid reactor, an ebullating bed reactor, a fluidized bed reactor, or the like.

The hydrogen-activating metal catalyst in the second catalytic reduction reactor unit may not be the same as the catalyst in the first catalytic reduction reactor units and may not even be a high void fraction catalyst, and can use metal support that is a cylinder that provide a lower void fraction catalyst. The molecular hydrogen activating metal and its description above for the high void fraction catalyst is also applicable for such lower void fraction catalysts.

In some embodiments, the fluid circulation loop may be configured to establish countercurrent flow in the hydrothermal digestion unit. As used herein, the term "countercurrent flow" refers to the direction a reaction product enters the hydrothermal digestion unit relative to the direction in which biomass is introduced to the digestion unit. Other flow configurations such as, for example, co-current flow may also be used, if desired.

In some embodiments, there may be a solids separation mechanism within at least some of the fluid inlet lines, within the fluid circulation loop, or both. Solids separation mechanisms may include any separation technique known in the art including filters, centrifugal force- or centrifugal force-based separation mechanisms (e.g., hydroclones), settling tanks, centrifuges, and the like. Suitable filters may include, for example, surface filters and depth filters. Surface filters may include, for example, filter papers, membranes, porous solid media, and the like. Depth filters may include, for example, a column or plug of porous media designed to trap solids within its core structure. In some embodiments, the biomass conversion systems may include a solids separation mechanism in fluid communication with at least some of the fluid inlet lines between the hydrothermal digestion unit and the first catalytic reduction reactor unit. In some embodiments, the biomass conversion systems may include a solids separation mechanism in fluid communication with the fluid circulation loop between an outlet of the hydrothermal digestion unit and an inlet of the second catalytic reduction reactor unit.

In more particular embodiments, the optional solids separation mechanism in at least some of the fluid inlet lines may comprise a hydroclone. When solids separation does take place in this location, a hydroclone may be an especially suitable solids separation mechanism, since it may not be necessary for exhaustive removal of all solids to take place before the hydrolysate enters the first catalytic reduction reactor unit(s). Particularly when a catalyst having a high void fraction (e.g., a non-plugging catalyst) is used in the first catalytic reduction reactor unit(s), a certain level of transported solids may be tolerable. Although a hydroclone may be particularly suitable for use within the fluid inlet line(s), it is to be recognized that any appropriate type of solids separation mechanism may be used, if needed, in various configurations of the biomass conversion systems. In some embodiments, each fluid inlet line connecting the hydrothermal digestion unit and the first catalytic reduction reactor unit(s) may contain a solids separation mechanism. In other embodiments, only a portion of the fluid inlet lines connecting the hydrothermal digestion unit and the first catalytic reduction reactor unit(s) may contain a solids separation mechanism. In still other embodiments, the fluid inlet lines connecting the hydrothermal digestion unit and the first catalytic reduction reactor unit(s) may lack a solids separation mechanism.

Within the fluid circulation loop, there may be more tolerance for longer fluid residence times (i.e., lower recycle ratios), and greater levity may be exercised in choosing a solids separation mechanism for this location. Accordingly, depending on operational constraints, one or more filters, hydroclones, settling tanks, centrifuges and/or the like may be used within the fluid circulation loop. In some embodiments, two or more filters may be used within the fluid circulation loop, where at least one of the filters may be backflushed to the hydrothermal digestion unit while forward fluid flow continues through at least some of the remaining filters and onward to the second catalytic reduction reactor unit. In some embodiments, one or more hydroclones may be used within the fluid circulation loop. Use of filters and hydroclones within the fluid circulation loop are described in commonly owned U.S. Patent Applications 61/576,623 and 61/576,717, each filed on Dec. 16, 2011, and incorporated herein by reference in its entirety.

In some embodiments, the biomass conversion systems may further comprise a fluid transfer line that establishes fluid communication between the first catalytic reduction reactor unit(s) and the fluid circulation loop. Use of a fluid transfer line in this location may allow a reaction product produced in the first catalytic reaction unit(s) to be directly transported to the fluid circulation loop and onward to the second catalytic reduction reactor unit, but without first travelling through the hydrothermal digestion unit. Reasons why one would desire to deliver the reaction product directly to the fluid circulation loop, as opposed to returning it to the hydrothermal digestion unit, may include, for example, thermal regulation of the hydrothermal digestion unit, maintaining flow balance, and the like. In configurations where there are multiple first catalytic reduction reactor units, each first catalytic reduction reactor unit may contain a fluid transfer line in some embodiments. In other embodiments, some of the first catalytic reduction reactor units may contain a fluid transfer line and some may lack a fluid transfer line.

In some embodiments, the hydrothermal digestion unit may be, for example, a pressure vessel of carbon steel, stainless steel, or a similar alloy. In some embodiments, a single hydrothermal digestion unit may be used. In other embodiments, multiple hydrothermal digestion units operating in series, parallel or any combination thereof may be used. In some embodiments, digestion may be conducted in a pressurized hydrothermal digestion unit operating continuously. However, in other embodiments, digestion may be conducted in batch mode. Suitable hydrothermal digestion units may include, for example, the "PANDIA™ Digester" (Voest-Alpine Industrienlagenbau GmbH, Linz, Austria), the "DEFIBRATOR Digester" (Sunds Defibrator AB Corporation, Stockholm, Sweden), the M&D (Messing & Durkee) digester (Bauer Brothers Company, Springfield, Ohio, USA) and the KAMYR Digester (Andritz Inc., Glens Falls, N.Y., USA). In some embodiments, the biomass may be at least partially immersed in the hydrothermal digestion unit. In other embodiments, the hydrothermal digestion unit may be operated as a trickle bed or pile-type hydrothermal digestion unit. Fluidized bed and stirred contact hydrothermal digestion units may also be used in some embodiments. Suitable hydrothermal digestion unit designs may include, for example, co-current, countercurrent, stirred contact, or fluidized bed hydrothermal digestion units.

In general, digestion may be conducted in a liquor phase. In some embodiments, the liquor phase may comprise a digestion solvent that comprises water. In some embodiments, the liquor phase may further comprise an organic solvent. In some embodiments, the organic solvent may comprise oxygenated intermediates produced from a catalytic reduction reaction of soluble carbohydrates. For example, in some embodiments, a digestion solvent may comprise oxygenated intermediates produced by a hydrogenolysis reaction or other catalytic reduction reaction of soluble carbohydrates. In some embodiments, the oxygenated intermediates may include those produced in the first catalytic reduction reactor unit(s) and the second catalytic reduction reactor unit. In some embodiments, bio-ethanol may be added to water as a startup digestion solvent, with a solvent comprising oxygenated intermediates being produced thereafter and introduced to the hydrothermal digestion unit. Any other organic solvent that is miscible with water may also be used as a startup digestion solvent, if desired. In general, a sufficient amount of liquor phase is present in the digestion process such that the biomass surface remains wetted. The amount of liquor phase may be further chosen to maintain a sufficiently high concentration of soluble carbohydrates to attain a desirably high reaction rate during catalytic reduction, but not so high such that degradation becomes problematic. In some embodiments, the concentration of soluble carbohydrates may be kept below about 5% by weight of the liquor phase to minimize degradation. However, it is to be recognized that higher concentrations may be used in some embodiments. In some embodiments, organic acids such as, for example, acetic acid, oxalic acid, salicylic acid, or acetylsalicylic acid may be included in the liquor phase as an acid promoter of the digestion process.

In some embodiments, prior to digestion, the cellulosic biomass may be washed and/or reduced in size (e.g., by chopping, crushing, debarking, and the like) to achieve a desired size and quality for being digested. The operations may remove substances that interfere with further chemical transformation of soluble carbohydrates and/or improve the penetration of digestion solvent into the biomass. In some embodiments, washing may occur within the hydrothermal digestion unit prior to pressurization. In other embodiments, washing may occur before the biomass is placed in the hydrothermal digestion unit.

In some embodiments, the digestion solvent or liquor may comprise oxygenated intermediates of an in situ generated organic solvent. As used herein, the term "in situ generated organic solvent" refers to the reaction product produced from a catalytic reduction reaction of soluble carbohydrates, where the catalytic reduction reaction takes place in one or more catalytic reduction reactor units coupled to the biomass conversion system. In some embodiments, the in situ generated organic solvent may comprise at least one alcohol, ketone, or polyol. In alternative embodiments, the digestion solvent may be at least partially supplied from an external source. For example, in an embodiment, bio-ethanol may be used to supplement the in situ-generated organic solvent. Other water-miscible organic solvents may be used as well. In some embodiments, the digestion solvent may be separated, stored, or selectively injected into the hydrothermal digestion unit so as to maintain a desired concentration of soluble carbohydrates or to provide temperature regulation in the hydrothermal digestion unit.

In some embodiments, digestion may take place over a period of time at elevated temperatures and pressures. In some embodiments, digestion may take place at a temperature ranging between about 100 degrees C. to about 250 degrees C. for a period of time. In some embodiments, the period of time may range between about 0.25 hours and about 24 hours. In some embodiments, the digestion to produce soluble carbohydrates may occur at a pressure ranging between about 1 bar (absolute) and about 100 bars.

In various embodiments, suitable biomass digestion techniques may include, for example, acid digestion, alkaline digestion, enzymatic digestion, and digestion using hot-compressed water.

Various factors may influence the digestion process. In some embodiments, hemicellulose may be extracted from the biomass at temperatures below about 160 degrees C. to produce a predominantly C5 carbohydrate fraction. At increasing temperatures, this C5 carbohydrate fraction may be thermally degraded. It may therefore be advantageous to convert the C5 and/or C6 carbohydrates and/or other sugar intermediates into more stable intermediates such as sugar alcohols, alcohols, and polyols, for example. By reacting the soluble carbohydrates in the catalytic reduction reactor unit(s) and recycling at least a portion of the reaction product to the hydrothermal digestion unit, the concentration of oxygenated intermediates may be increased to commercially viable concentrations while the concentration of soluble carbohydrates is kept low.

In some embodiments, cellulose digestion may begin above about 160 degrees C., with solubilization becoming complete at temperatures around about 190 degrees C., aided by organic acids (e.g., carboxylic acids) formed from partial degradation of carbohydrate components. Some lignins may be solubilized before cellulose, while other lignins may persist to higher temperatures. These lignins may optionally be removed at a later time. The digestion temperature may be chosen so that carbohydrates are solubilized while limiting the formation of degradation products. In some embodiments, the digestion process may be conducted in stages, with a first stage being conducted at about 160 degrees C. or below to solubilize and convert hemicellulose into a reaction product, and with a second stage being conducted at about 160 degrees C. or above to solubilize and convert cellulose into a reaction product.

In some embodiments, a plurality of hydrothermal digestion units may be used. In some embodiments, the biomass may first be introduced into a hydrothermal digestion unit operating at about 160 degrees C. or below to solubilize C5 carbohydrates and some lignin without substantially degrading these products. The remaining biomass may then exit the first hydrothermal digestion unit and pass to a second hydrothermal digestion unit. The second hydrothermal digestion unit may be used to solubilize C6 carbohydrates at a higher temperature. In some embodiments, a series of hydrothermal digestion units may be used with an increasing temperature profile, so that a desired carbohydrate fraction is solubilized in each.

In some embodiments, the biomass conversion systems may further comprise a biomass feed mechanism that is operatively coupled to the hydrothermal digestion unit and allows cellulosic biomass solids to be continuously or semi-continuously added to the hydrothermal digestion unit without the hydrothermal digestion unit being fully depressurized. In some embodiments, the biomass feed mechanism may comprise a pressurization zone. Cellulosic biomass may be pressurized using the pressurization zone and then introduced to the hydrothermal digestion unit in a continuous or semi-continuous manner without fully depressurizing the digestion unit. Pressurizing the cellulosic biomass prior to its introduction to the hydrothermal digestion unit may allow the digestion unit to remain pressurized and operating continuously during biomass addition. Additional benefits of pressurizing the cellulosic biomass prior to hydrothermal digestion are also discussed hereinafter.

In some embodiments, the biomass conversion systems may further comprise a loading mechanism that is operatively connected to the pressurization zone. Any type of loading mechanism capable of dropping or transporting cellulosic biomass may be used in the present embodiments. Suitable loading mechanisms may include, for example, conveyer belts, vibrational tube conveyers, screw feeders or conveyers, bin dispensers, and the like. It is to be recognized that in some embodiments, the loading mechanism may be omitted. For example, in some embodiments, addition of cellulosic biomass to the pressurization zone may take place manually. In some embodiments, the cellulosic biomass may be provided and introduced to the pressurization zone at the same time. That is, a loading mechanism need not necessarily be used.

During the operation of the biomass conversion systems, the pressurization zone may cycle between a pressurized state and an at least partially depressurized state, while the hydrothermal digestion unit may remain continuously operating in a pressurized state. While the pressurization zone is at least partially depressurized, cellulosic biomass may be introduced to the pressurization zone via the loading mechanism, if used. Suitable types of pressurization zones and operation thereof are described in commonly owned U.S. patent application Ser. Nos. 13/332,322 and 13/332,329, each filed on Dec. 20, 2011 and incorporated herein by reference in its entirety.

In some embodiments, the cellulosic biomass within the pressurization zone may be pressurized, at least in part, by introducing at least a portion of the liquor phase in the hydrothermal digestion unit to the pressurization zone. In some or other embodiments, the cellulosic biomass within the pressurization zone may be pressurized, at least in part, by introducing a gas to the pressurization zone. In some embodiments, the liquor phase may comprise an organic solvent, which is generated as a reaction product of the catalytic reduction reactor unit(s). In other embodiments, an external solvent may be used to pressurize the pressurization zone.

At least two benefits may be realized by pressurizing the biomass in the presence of the liquor phase from the hydrothermal digestion unit. First, pressurizing the biomass in the presence of the liquor phase may cause the digestion solvent to infiltrate the biomass, which may cause the biomass to sink in the digestion solvent once introduced to the hydrothermal digestion unit. Further, by adding hot liquor phase to the biomass in the pressurization zone, less energy may need to be input to bring the biomass up to temperature once introduced to the hydrothermal digestion unit. Both of these features may improve the efficiency of the digestion process.

In some embodiments, the present biomass conversion systems may further comprise a phase separation mechanism in fluid communication with an outlet of the second catalytic reduction reactor unit. Suitable phase separation mechanisms may include for, example, phase separators, solvent stripping columns, extractors, filters, distillations, and the like. In some embodiments, azeotropic distillation may be conducted. In some embodiments, the phase separation mechanism may be used to separate an aqueous phase and an organic phase of the reaction product. In some embodiments, at least a portion of the aqueous phase may be recirculated to the hydrothermal digestion unit. In some or other embodiments, at least a portion of the organic phase may be removed from the fluid circulation loop and subsequently be converted into a biofuel, as described hereinafter. In some embodiments, at least a portion of the organic phase may be recirculated to the hydrothermal digestion unit.

The biomass conversion systems of the foregoing description will now be further described with reference to the drawings. FIG. 1 shows a schematic of an illustrative biomass conversion system, biomass conversion system 1, having a catalytic reduction reactor unit fluidly coupled to a hydrothermal digestion unit at various points along its height. Biomass conversion system 1 contains hydrothermal digestion unit 2, which is coupled to first catalytic reduction reactor unit 6 containing the high void fraction hydrogen-activating supported metal catalyst 7 via fluid inlet lines 8 and fluid return lines 8'. Although FIG. 1 has depicted five pairs of fluid inlet lines 8 and fluid return lines 8', it is to be recognized that any number can be present.

Hydrothermal digestion unit 2 is in fluid communication with second catalytic reduction reactor unit 12 via fluid circulation loop 10. As drawn, fluid circulation loop 10 is configured to establish countercurrent flow in hydrothermal digestion unit 2. Other types of fluid connections to hydrothermal digestion unit 2 are also possible. The direction of biomass introduction into hydrothermal digestion unit 2 and flow of bulk biomass therein is indicated by a dashed arrow. Hydrogen feed lines to first catalytic reduction reactor unit 6 and to second catalytic reduction reactor unit 12 have not been depicted for purposes of clarity.

Biomass conversion system 1 also contains reaction product takeoff line 14, which is in fluid communication with fluid circulation loop 10 after the outlet of second catalytic reduction reactor unit 12. During operation of the biomass conversion systems, a reaction product may exit second catalytic reduction reactor unit 12 via line 20. Reaction product may then be removed from fluid circulation loop 10 by reaction product takeoff line 14 for subsequent further transformation into a biofuel, or the reaction product may be returned to hydrothermal digestion unit 2 via line 22, where it may serve as a digestion solvent or undergo further conversion, for example.

Various optional elements may be present in biomass conversion system 1. As described above, in some embodiments, solids separation mechanism 16, such as a hydroclone, for example, may be located within any of fluid inlet lines 8. As drawn, FIG. 1 has depicted solids separation mechanism 16 within only one fluid inlet line 8, however, it is to be recognized that any number of the fluid inlet lines 8 may contain solids separation mechanism 16, if desired. As also described above, solids separation mechanism 18 may also be present in fluid circulation loop 10. As depicted, solids separation mechanism 18 is located before an inlet of second catalytic reduction reactor unit 12, such that entry of particulate matter thereto is inhibited. In some embodiments, solids separation mechanism 18 may comprise two or more reciprocating filters, or a filter array, where some of the filters can maintain fluid flow in the forward direction, while at least one filter is being backflushed or otherwise regenerated. In some embodiments, solids separation mechanism 18 may comprise a hydroclone.

Another optional element of biomass conversion system 1 is fluid bypass line 24, which establishes fluid communication between first catalytic reduction reactor unit 6 and fluid circulation loop 10. Fluid bypass line 24 can allow a reaction product to be directly transported from first catalytic reduction reactor unit 6 containing the high void fraction catalyst 7 directly to fluid circulation loop 10 without directly travelling through hydrothermal digestion unit 2. As drawn, fluid bypass line 24 establishes fluid communication to fluid circulation loop 10 at line 17. However, it is to be recognized that fluid bypass line 24 may establish fluid communication at any point in fluid circulation loop 10, including to second catalytic reduction reactor unit 12, if desired. Although FIG. 1 has shown only one fluid bypass line 24, it is to be recognized that any number can be present.

Still another optional element of biomass conversion system 1 is gas recycle line 26 that allows a gas to travel between first catalytic reduction reactor unit 6 and second catalytic reduction reactor unit 12. Specifically, gas recycle line 26 can allow unreacted hydrogen gas to travel from first catalytic reduction reactor unit 6 to second catalytic reduction reactor unit 12, or vice versa, during operation of biomass conversion system 1. The opportunity to recycle the hydrogen gas can reduce the overall hydrogen requirements of the biomass conversion process. Hydrogen gas inlet lines to first catalytic reduction reactor unit 6 and second catalytic reduction reactor unit 12 have been omitted in FIG. 1 for purposes of clarity. In some embodiments, the hydrogen gas may be generated in situ elsewhere in the biomass conversion systems.

Still another optional element that may be included in biomass conversion system 1 is phase separation mechanism 29, which is in fluid communication with line 20. As described above, phase separation mechanism 29 may be used to at least partially separate the organic phase of the reaction product from an aqueous phase.

Optional line 28 may be used to transfer liquor phase from hydrothermal digestion unit 2. For example, line 28 may be used to transfer liquor phase from hydrothermal digestion unit 2 to at least partially pressurize pressurization zone 3. Cellulosic biomass solids may be supplied to pressurization zone 3 from loading mechanism 5 before pressurizing and introducing the pressurized biomass to hydrothermal digestion unit 2. Pressurization zone 3 can be used to step up the pressure of the biomass solids introduced from loading mechanism 5, such that hydrothermal digestion unit 2 does not have to be fully depressurized during biomass solids addition, thereby allowing the digestion process to proceed in a substantially uninterrupted manner.

Figure 2:
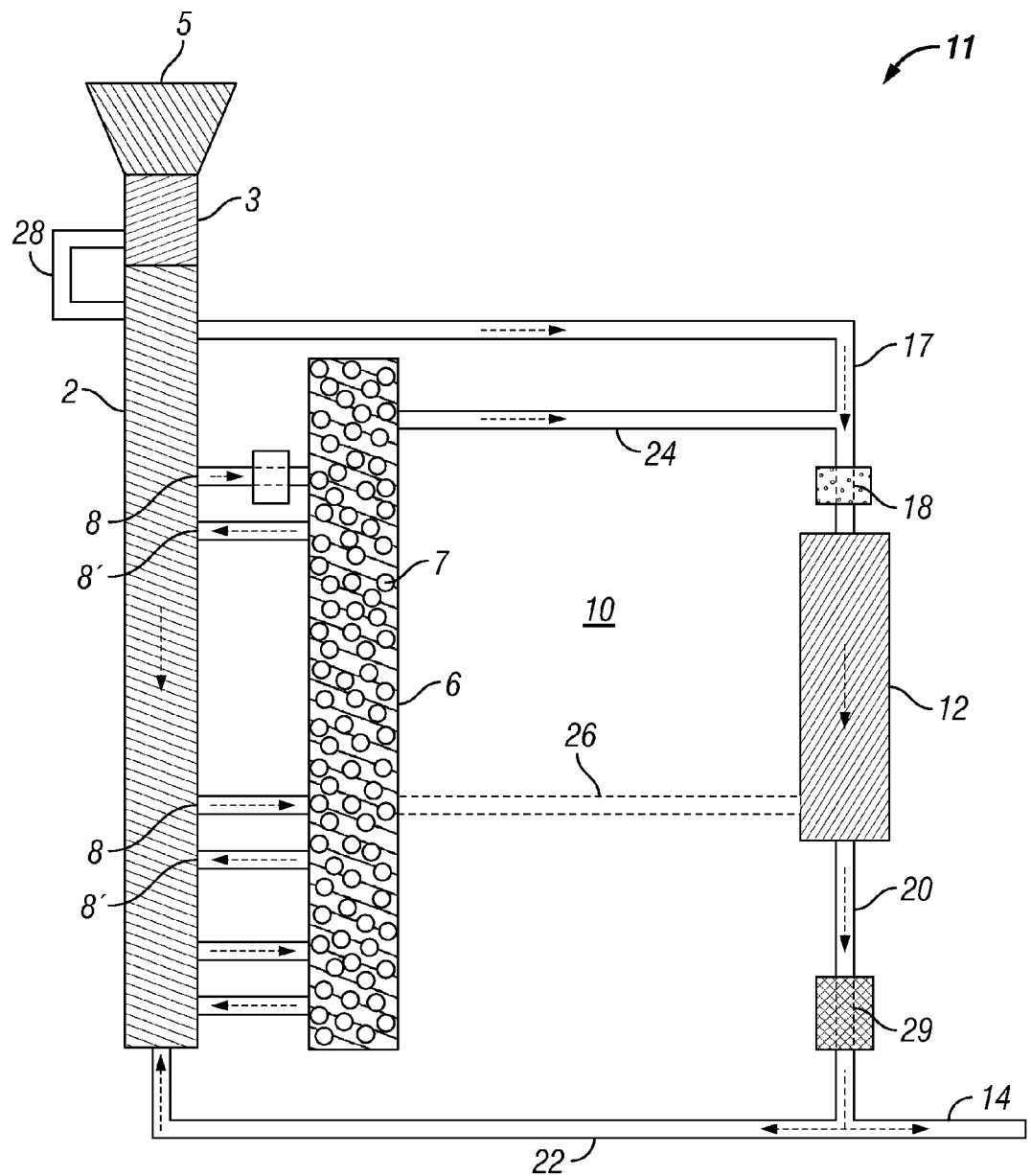
FIG. 2 is a schematically illustrated block flow diagram of an embodiment of the biomass conversion process having a catalytic reduction reactor unit containing the high void fraction catalyst, fluidly coupled to a hydrothermal digestion unit at various points along its height where the points of fluid coupling are spaced non-uniformly.

Although FIG. 1 has depicted a substantially regular spacing of fluid inlet lines 8 and fluid return lines 8' along the height of hydrothermal digestion unit 2, it is to be recognized that fluid inlet lines 8 and fluid return lines 8' may be spaced non-uniformly along the height of hydrothermal digestion unit 2, as described hereinabove. FIG. 2 shows a schematic of an illustrative biomass conversion system 11 having a catalytic reduction reactor unit fluidly coupled to a hydrothermal digestion unit at various points along its height, where the points of fluid coupling are spaced non-uniformly. In addition, FIG. 2 has depicted a schematic of an illustrative biomass conversion system 21 with a reduced number of fluid inlet lines 8 and fluid return lines 8' relative to FIG. 1. The remaining reference characters depicted in FIG. 2 are substantially the same as depicted and described in FIG. 1 and will not be described again in detail.

Figure 3:
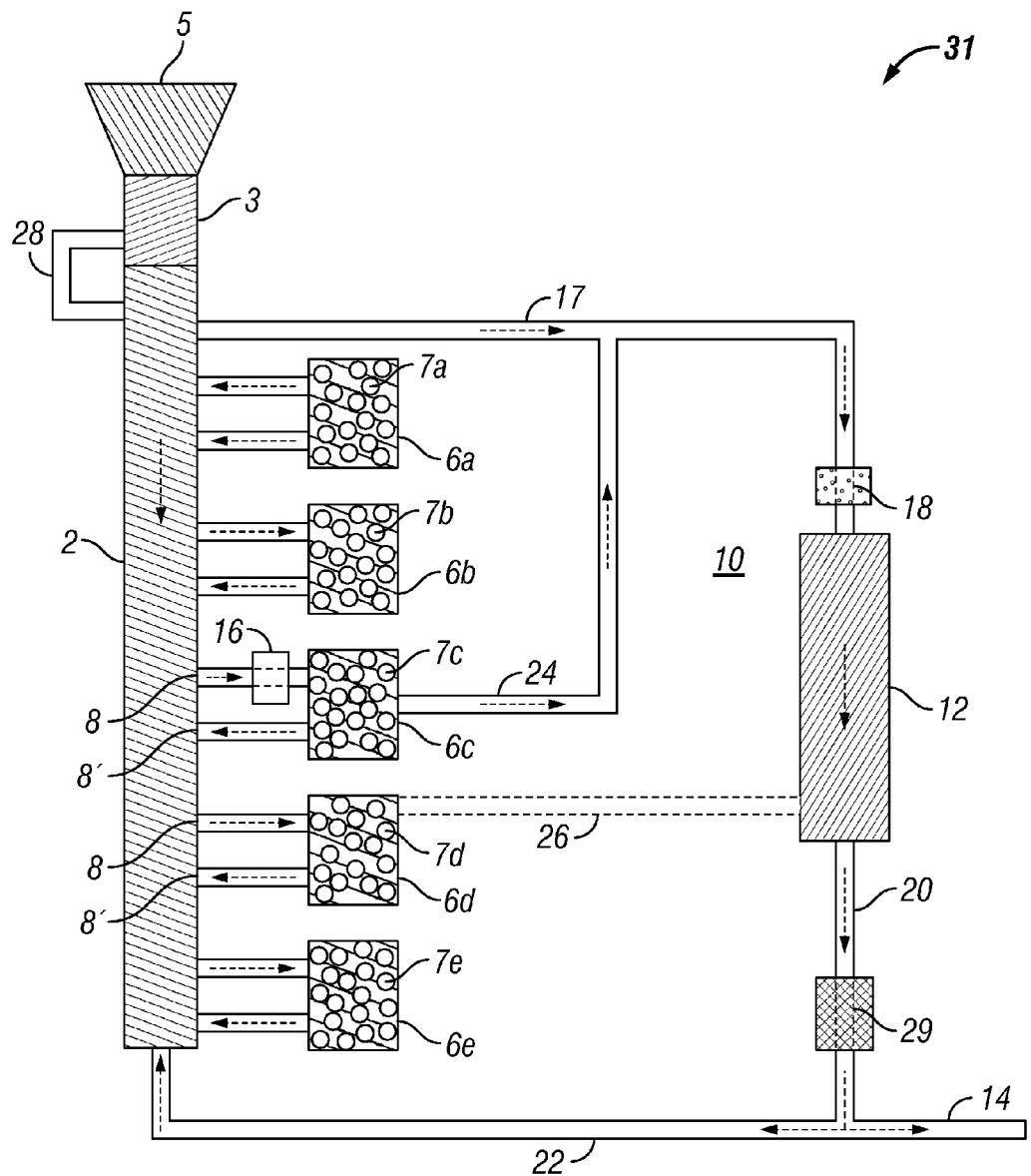
FIG. 3 is a schematically illustrated block flow diagram of an embodiment of the biomass conversion process having multiple catalytic reduction reactor units containing high void fraction catalysts, fluidly coupled to a hydrothermal digestion unit at various points along its height
Figure 4A:
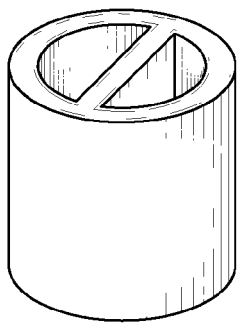
FIGS. 4A-4K illustrate examples of the types of catalyst support structures that may give rise to high void fraction.
Figure 4B:
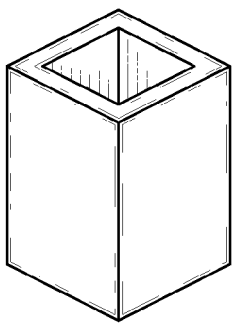
Figure 4C:
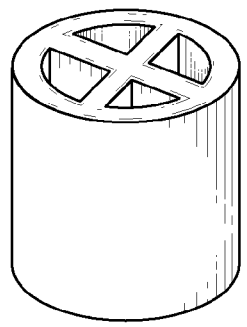
Figure 4D:
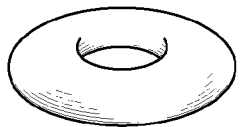
Figure 4E:
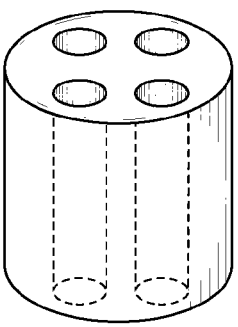
Figure 4F:
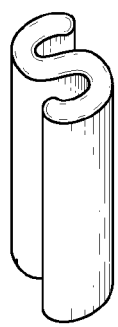
Figure 4G:
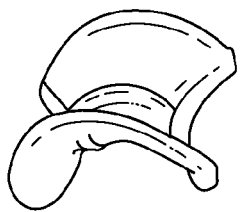
Figure 4H:
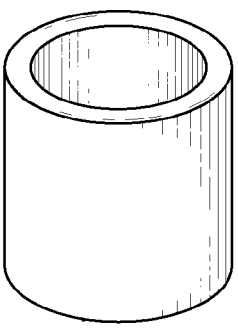
Figure 4I:
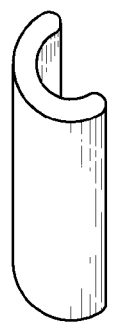
Figure 4J:
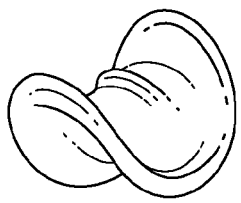
Figure 4K:
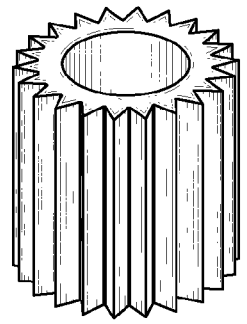

As described above, in some embodiments, one or more first catalytic reduction reactor units may be coupled to the hydrothermal digestion unit along its height, as opposed to a single first catalytic reduction reactor unit coupled at multiple points with fluid inlet lines and fluid outlet lines, as depicted in FIG. 1 and FIG. 2. FIG. 3 shows a schematic of an illustrative biomass conversion system 31 having multiple catalytic reduction reactor units containing the high void fraction metal catalyst fluidly coupled to a hydrothermal digestion unit at various points along its height. As depicted in FIG. 3, five first catalytic reduction reactor units 6a-6e have replaced a single first catalytic reduction reactor unit 6 of FIG. 1 and FIG. 2. The remaining reference characters in FIG. 3 are substantially the same as depicted and described in FIG. 1 and will not be described again in detail. Although FIG. 3 has depicted five first catalytic reduction reactor units each containing same or different high void fraction hydrogen-activation supported metal catalyst 7a-7e coupled to hydrothermal digestion unit 2, it is to be recognized that any configuration having two or more parallel first catalytic reduction reactor units may be used. Furthermore, optional elements, such as solids separation mechanism 16 and gas recycle line 26, when present, may be used in conjunction with a single first catalytic reduction reactor unit, as depicted, or any number of the other first catalytic reduction reactor units. In addition, although first catalytic reduction reactor units 6a-6e have each been depicted with a single fluid inlet line 8 and a single fluid return line 8', more than one of either may be used, if desired. As in FIG. 1, hydrogen gas inlet lines to catalytic reduction reactor units 6a-6e and 12 of FIG. 3 have been omitted for purposes of clarity.

In some embodiments, heating the cellulosic biomass solids in the hydrothermal digestion unit may take place at a pressure of at least about 30 bar. Maintaining digestion at a pressure of at least about 30 bar may ensure that digestion takes place at a satisfactory rate. In some embodiments, heating the cellulosic biomass solids in the hydrothermal digestion unit may take place at a pressure of at least about 60 bar. In some embodiments, heating the cellulosic biomass solids in the hydrothermal digestion unit may take place at a pressure of at least about 90 bar. In some embodiments, heating the cellulosic biomass solids in the hydrothermal digestion unit may take place at a pressure ranging between about 30 bar and about 430 bar. In some embodiments, heating the cellulosic biomass solids in the hydrothermal digestion unit may take place at a pressure ranging between about 50 bar and about 330 bar. In some embodiments, heating the cellulosic biomass solids in the hydrothermal digestion unit may take place at a pressure ranging between about 70 bar and about 130 bar. In some embodiments, heating the cellulosic biomass solids in the hydrothermal digestion unit may take place at a pressure ranging between about 30 bar and about 130 bar. It is to be noted that the foregoing pressures refer to the pressures at which digestion takes place. That is, the foregoing pressures refer to normal operating pressures for the hydrothermal digestion unit.

As set forth above, embodiments of the biomass conversion systems described herein are particularly advantageous in being capable of quickly removing a hydrolysate from the hydrothermal digestion unit and at least partially transforming soluble carbohydrates in the hydrolysate into a reaction product comprising oxygenated intermediates. In accomplishing the foregoing, in some embodiments, the liquor phase containing the reaction product may be recirculated from any of the catalytic reduction reactor units to the hydrothermal digestion unit, where the liquor phase may, for example, help regulate temperature therein, serve as a digestion solvent, and the like. Recirculation from the first catalytic reduction reactor unit(s) and the second catalytic reduction reactor unit may take place at various recycle ratios. With regard to the first catalytic reduction reactor unit(s), the term "recycle ratio" refers to the amount of liquor phase that is circulated to the first catalytic reduction reactor unit(s) relative to the amount of liquor phase that is transferred to the fluid circulation loop. With regard to the second catalytic reduction reactor unit, the term "recycle ratio" refers to the amount of liquor phase that is recirculated to the hydrothermal digestion unit relative to the amount of liquor phase that is withdrawn from the fluid circulation loop, by a reaction product take-off line, for example. An advantage of the present biomass conversion systems is that they may allow lower recycle ratios to be used in the fluid circulation loop than for other types of related biomass conversion systems. Accordingly, a relatively high proportion of the liquor phase passing through the fluid circulation loop may be withdrawn for subsequent conversion into a biofuel. Lower recycle ratios may also allow smaller reactor volumes to be used, as total liquid flow velocity in the hydrothermal digestion unit and catalytic reduction reactor are reduced. High recycle ratios and high liquid flow velocities may give rise to excessive pressure drops, high pump energy and size requirements, and other adverse features. Failure to minimize residence time prior to stabilization via a catalytic reduction reaction may also result in lower yields. Given the benefit of the present disclosure, one having ordinary skill in the art will be able to determine an appropriate recycle ratio within fluid circulation loop that achieves a desired amount of heat integration, while balancing a desired rate of downstream biofuel production.

In some embodiments, the liquor phase can be recirculated between the hydrothermal digestion unit and the first catalytic reduction reactor unit(s) at a recycle ratio ranging between about 1 and about 30. In other embodiments, the liquor phase can be recirculated between the hydrothermal digestion unit and the first catalytic reduction reactor unit(s) at a recycle ratio ranging between about 1 and about 20, or between about 1 and about 15, or between about 1 and about 10, or between about 1 and about 5. When more than one first catalytic reduction reactor unit is present, the recycle ratio between each catalytic reduction reactor unit may be the same, in some embodiments, or at least some of the recycle ratios may be different, in other embodiments.

In some embodiments, the liquor phase may be recirculated between within the fluid circulation loop at a recycle ratio ranging between about 0.2 and about 10. That is, in such embodiments, the liquor phase may be recirculated between the second catalytic reduction reactor unit and the hydrothermal digestion unit at a recycle ratio ranging between about 0.2 and about 10. In some embodiments, the liquor phase may be recirculated between the second catalytic reduction reactor unit and the hydrothermal digestion unit at a recycle ratio ranging between about 1 and about 10, or between about 1 and about 5, or between about 0.2 and about 2, or between about 0.5 and about 2, or between about 1 and about 2, or between about 0.2 and about 1, or between about 0.5 and about 1.

In some embodiments, recirculation from the second catalytic reduction reactor unit to the hydrothermal digestion unit (i.e., within the fluid circulation loop), may take place such that countercurrent flow is established in the hydrothermal digestion unit. In some embodiments, recirculation may take place such that a different flow motif is established, such as co-current flow, for example.

In some embodiments, the present methods may further comprise performing a phase separation of the reaction product. In some embodiments, phase separation may take place using a phase separation mechanism that is in fluid communication with the fluid circulation loop following an outlet of the second catalytic reduction reactor unit. In various embodiments, performing a phase separation may comprise separating a bilayer, conducting a solvent stripping operation, performing an extraction, performing a filtration, performing a distillation, or the like. In some embodiments, azeotropic distillation may be conducted.

As described above, the hydrothermal digestion unit may be operated over a range of temperatures. Furthermore, the hydrothermal digestion unit may also operate with a temperature gradient therein. That is, in some embodiments, the hydrothermal digestion unit may have a non-uniform temperature distribution about its height. As used herein, a "non-uniform temperature distribution" refers to a condition in which different regions of the hydrothermal digestion unit have different temperatures. In some embodiments, there may be a progressive increase in temperatures proceeding from the top to the bottom of the hydrothermal digestion unit. In some embodiments, a region of the hydrothermal digestion unit having the highest temperature may be in the middle of the hydrothermal digestion unit. Accordingly, cellulosic biomass solids in the hydrothermal digestion unit may be undergoing digestion over a range of temperatures, in some embodiments. In the higher temperature regions of the hydrothermal digestion unit, soluble carbohydrates within the liquor phase may be more susceptible to decomposition. The embodiments described herein may be particularly advantageous for addressing potential degradation of soluble carbohydrates that may arise from the temperature gradient within the hydrothermal digestion unit. Specifically, in some embodiments, the fluid inlet lines and fluid return lines coupling the hydrothermal digestion unit to the first catalytic reduction reactor unit(s) may be more heavily concentrated in the higher temperature regions in order to more efficiently transfer the soluble carbohydrates away from potentially degrading temperatures. In some embodiments, there may be more pairs of fluid inlet lines and fluid return lines in the higher temperature regions of the hydrothermal digestion unit than in lower temperature regions of the hydrothermal digestion unit. In some embodiments, the liquor phase in the hydrothermal digestion unit may be transferred to the first catalytic reduction reactor unit(s) more rapidly from higher temperature regions of the hydrothermal digestion unit than from lower temperature regions of the hydrothermal digestion unit.

In some embodiments, the methods described herein may further comprise converting the hydrolysate into a biofuel. In some embodiments, conversion of the hydrolysate into a biofuel may begin with a catalytic hydrogenolysis reaction to transform soluble carbohydrates produced from digestion into a reaction product comprising oxygenated intermediates, as described above. As described above and depicted in FIGS. 1-3, the reaction product may be recirculated to the hydrothermal digestion unit to further aid in the digestion process. In some embodiments, the reaction product may be further transformed by any number of further catalytic reforming reactions including, for example, further catalytic reduction reactions (e.g., hydrogenolysis reactions, hydrogenation reactions, hydrotreating reactions, and the like), condensation reactions, isomerization reactions, desulfurization reactions, dehydration reactions, oligomerization reactions, alkylation reactions, and the like. A description of the initial hydrogenolysis reaction and the further catalytic reforming reactions are described hereinafter.

Various processes are known for performing hydrogenolysis of carbohydrates. One suitable method includes contacting a carbohydrate or stable hydroxyl intermediate with hydrogen, optionally mixed with a diluent gas, and a hydrogenolysis catalyst under conditions effective to form a reaction product comprising oxygenated intermediates such as, for example, smaller molecules or polyols. As used herein, the term "smaller molecules or polyols" includes any molecule that have a lower molecular weight, which may include a smaller number of carbon atoms or oxygen atoms, than the starting carbohydrate. In some embodiments, the reaction products may include smaller molecules such as, for example, polyols and alcohols. This aspect of hydrogenolysis entails the breaking of carbon-carbon bonds In some embodiments, a soluble carbohydrate may be converted to relatively stable oxygenated intermediates such as, for example, propylene glycol, ethylene glycol, and glycerol using a hydrogenolysis reaction in the presence of a catalyst that is capable of activating molecular hydrogen. Suitable catalysts for the second catalytic reduction reactor may include, for example, Cr, Mo, W, Re, Mn, Cu, Cd, Fe, Co, Ni, Pt, Pd, Rh, Ru, Ir, Os, and alloys or any combination thereof, either alone or with promoters such as Au, Ag, Cr, Zn, Mn, Sn, Bi, B, O, and alloys or any combination thereof. In some embodiments, the catalysts and promoters may allow for hydrogenation and hydrogenolysis reactions to occur at the same time or in succession, such as the hydrogenation of a carbonyl group to form an alcohol. The catalyst may also include a carbonaceous pyropolymer catalyst containing transition metals (e.g., chromium, molybdenum, tungsten, rhenium, manganese, copper, and cadmium) or Group VIII metals (e.g., iron, cobalt, nickel, platinum, palladium, rhodium, ruthenium, iridium, and osmium). In certain embodiments, the catalyst may include any of the above metals combined with an alkaline earth metal oxide or adhered to a catalytically active support. In certain embodiments, the catalyst described in the hydrogenolysis reaction may include a catalyst support. The void fraction of the catalysts for the second catalytic reduction reactor may be the high void fraction supported metal catalyst used in the first catalyst reduction reactor or may be a lower void fraction supported metal catalyst having a void volume of as low as 20%. Thus, for example, second catalytic reduction reactor unit may contain a metal catalyst having an average void fraction in the range of 20% to 95% and a surface area in the range of about 10 $m^2$/g to 1000 $m^2$/g that may be a low void fraction catalyst and/or a high void fraction catalyst such as used in the first catalystic reduction reactor. The low void fraction catalyst may have an average void fraction in the range of from 20% to below 45% (or from 20% to 40% or below). The conditions under which to carry out the hydrogenolysis reactions in both first and second catalytic reduction reactors will vary based on the type of biomass starting material and the desired products (e.g. gasoline or diesel), for example. One of ordinary skill in the art, with the benefit of this disclosure, will recognize the appropriate conditions to use to carry out the reaction. In general, the hydrogenolysis reaction may be conducted at temperatures in the range of about 110 degrees C. to less than about 300 degrees C., and preferably from about 170 degrees C. to less than 300 degrees C., and most preferably from about 180 degrees C. to about 290 degrees C.

In some embodiments, the hydrogenolysis reaction may be conducted under basic conditions, preferably at a pH of about 7 to about 13, and even more preferably at a pH of about 10 to about 12. In other embodiments, the hydrogenolysis reaction may be conducted under mildly acidic conditions, preferably at a pH from about 5 to about 7. In some embodiments, the hydrogenolysis reaction may be conducted at a pressure ranging between about 1 bar (absolute) and about 150 bar, and preferably at a pressure ranging between about 15 bar and about 140 bar, and even more preferably at a pressure ranging between 50 bar and 110 bar.

The hydrogen used in the hydrogenolysis reaction may include external hydrogen, recycled hydrogen, in situ generated hydrogen, or any combination thereof.

In some embodiments, the reaction products of the hydrogenolysis reaction may comprise greater than about 25% by mole, or alternatively, greater than about 30% by mole of polyols, which may result in a greater conversion to a biofuel in a subsequent processing reaction.

In some embodiments, hydrogenolysis may be conducted under neutral or acidic conditions, as needed to accelerate hydrolysis reactions in addition to the hydrogenolysis reaction. For example, hydrolysis of oligomeric carbohydrates may be combined with hydrogenation to produce sugar alcohols, which may undergo hydrogenolysis.

A second aspect of hydrogenolysis entails the breaking of —OH bonds such as: $RC(H)_2—OH+H_2 \rightarrow RCH_3+H_2O$. This reaction is also called "hydrodeoxygenation," and may occur in parallel with C—C bond breaking hydrogenolysis. Diols may be converted to mono-oxygenates via this reaction. As reaction severity is increased with increased temperature or contact time with catalyst, the concentration of polyols and diols relative to mono-oxygenates may diminish as a result of hydrodeoxygenation. Selectivity for C—C vs. C—OH bond hydrogenolysis will vary with catalyst type and formulation. Full de-oxygenation to alkanes may also occur, but is generally undesirable if the intent is to produce mono-oxygenates or diols and polyols which may be condensed or oligomerized to higher molecular weight compounds in a subsequent processing step. Typically, it is desirable to send only mono-oxygenates or diols to subsequent processing steps, as higher polyols may lead to excessive coke formation during condensation or oligomerization. Alkanes, in contrast, are essentially unreactive and cannot be readily combined to produce higher molecular compounds.

Once oxygenated intermediates have been formed by a hydrogenolysis reaction, a portion of the reaction product may be recirculated to the hydrothermal digestion unit to serve as an internally generated digestion solvent. Another portion of the reaction product may be withdrawn and subsequently processed by further reforming reactions to form a biofuel. Before being subjected to the further reforming reactions, the oxygenated intermediates may optionally be separated into different components. Suitable separations may include, for example, phase separation, solvent stripping columns, extractors, filters, distillations and the like. In some embodiments, a separation of lignin from the oxygenated intermediates may be conducted before the reaction product is subsequently processed further or recirculated to the hydrothermal digestion unit.

The oxygenated intermediates may be processed to produce a fuel blend in one or more processing reactions. In some embodiments, a condensation reaction may be used along with other reactions to generate a fuel blend and may be catalyzed by a catalyst comprising an acid, a base, or both. In general, without being limited to any particular theory, it is believed that the basic condensation reactions may involve a series of steps involving: (1) an optional dehydrogenation reaction; (2) an optional dehydration reaction that may be acid catalyzed; (3) an aldol condensation reaction; (4) an optional ketonization reaction; (5) an optional furanic ring opening reaction; (6) hydrogenation of the resulting condensation products to form a >C4 hydrocarbon; and (7) any combination thereof. Acid catalyzed condensations may similarly entail optional hydrogenation or dehydrogenation reactions, dehydration, and oligomerization reactions. Additional polishing reactions may also be used to conform the product to a specific fuel standard, including reactions conducted in the presence of hydrogen and a hydrogenation catalyst to remove functional groups from final fuel product. In some embodiments, a basic catalyst, a catalyst having both an acid and a base functional site, and optionally comprising a metal function, may also be used to effect the condensation reaction.

"Acidic" conditions or "acidic functionality" for the catalysts refer to either Bronsted or Lewis acid acidity. For Bronsted acidity, the catalyst is capable of donating protons (designed as $H^+$) to perform the catalytic reaction, under the conditions present in the catalytic reactor. Acidic ion exchange resins, phosphoric acid present as a liquid phase on a support, are two examples. Metal oxides such as silica, silica-aluminas, promoted zirconia or titania can provide protons $H^+$ associated with Bronsted acidity in the presence of water or water vapor. Lewis acidity entails ability to accept an electron pair, and most typically is obtained via the presence of metal cations in a mixed metal-oxide framework such as silica-alumina or zeolite. Determination of acidic properties can be done via adsorption of a base such as ammonia, use of indictors, or via use of a probe reaction such as dehydration of an alcohol to an olefin, which is acid catalyzed. "Basic" conditions or "base functionality" for the catalysts can refer to either Bronsted or Lewis basicity. For Bronsted basicity, hydroxide anion is supplied by the catalyst, which may be present as an ion exchange resin, or supported liquid phase catalyst, mixed metal oxide with promoter such as alkali, calcium, or magnesium, or in free solution. Lewis base catalysis refers to the conditions where Lewis base catalysis is the process by which an electron pair donor increases the rate of a given chemical reaction by interacting with an acceptor atom in one of the reagents or substrate (see Scott E. Denmark and Gregory L. Beutner, Lewis Base Catalysis in Organic Synthesis, Angew. Chem. Int. Ed. 2008, 47, 1560-1638). Presence and characterization of basic sites for a heterogeneous catalyst may be determined via sorption of an acidic component, use of probe reactions, or use of indicators. (see K. Tanabe, M. Misono, Y. Ono, H. Hattori (Eds.), New Solid Acids and Bases, Kodansha/Elsevier, Tokyo/Amsterdam, 1989, pp. 260-267). Catalysts such as mixed metal oxides may be "amphoteric", or capable of acting as acidic or basic catalysts depending on process conditions (pH, water concentration), or exhibit both acidic and basic properties under specific operating conditions, as a result of surface structures generated during formulation, or in situ during use to effect catalytic reactions.

In an embodiment, the aldol condensation reaction may be used to produce a fuel blend meeting the requirements for a diesel fuel or jet fuel. Traditional diesel fuels are petroleum distillates rich in paraffinic hydrocarbons. They have boiling ranges as broad as 187 degrees C. to 417 degrees C., which are suitable for combustion in a compression ignition engine, such as a diesel engine vehicle. The American Society of Testing and Materials (ASTM) establishes the grade of diesel according to the boiling range, along with allowable ranges of other fuel properties, such as cetane number, cloud point, flash point, viscosity, aniline point, sulfur content, water content, ash content, copper strip corrosion, and carbon residue. Thus, any fuel blend meeting ASTM D975 can be defined as diesel fuel.

Certain embodiments of the present invention also provide methods to produce jet fuel. Jet fuel is clear to straw colored. The most common fuel is an unleaded/paraffin oil-based fuel classified as Aeroplane A-1, which is produced to an internationally standardized set of specifications. Jet fuel is a mixture of a large number of different hydrocarbons, possibly as many as a thousand or more. The range of their sizes (molecular weights or carbon numbers) is restricted by the requirements for the product, for example, freezing point or smoke point. Kerosene-type Airplane fuel (including Jet A and Jet A-1) has a carbon number distribution between about C8 and C16. Wide-cut or naphtha-type Airplane fuel (including Jet B) typically has a carbon number distribution between about C5 and C15. A fuel blend meeting ASTM D1655 can be defined as jet fuel.

In certain embodiments, both Airplanes (Jet A and Jet B) contain a number of additives. Useful additives include, but are not limited to, antioxidants, antistatic agents, corrosion inhibitors, and fuel system icing inhibitor (FSII) agents. Antioxidants prevent gumming and usually, are based on alkylated phenols, for example, AO-30, AO-31, or AO-37. Antistatic agents dissipate static electricity and prevent sparking. Stadis 450 with dinonylnaphthylsulfonic acid (DINNSA) as the active ingredient, is an example. Corrosion inhibitors, e.g., DCI-4A are used for civilian and military fuels and DCI-6A is used for military fuels. FSII agents, include, e.g., Di-EGME.

In an embodiment, the oxygenated intermediates may comprise a carbonyl-containing compound that can take part in a base catalyzed condensation reaction. In some embodiments, an optional dehydrogenation reaction may be used to increase the amount of carbonyl-containing compounds in the oxygenated intermediate stream to be used as a feed to the condensation reaction. In these embodiments, the oxygenated intermediates and/or a portion of the bio-based feedstock stream can be dehydrogenated in the presence of a catalyst.

In an embodiment, a dehydrogenation catalyst may be preferred for an oxygenated intermediate stream comprising alcohols, diols, and triols. In general, alcohols cannot participate in aldol condensation directly. The hydroxyl group or groups present can be converted into carbonyls (e.g., aldehydes, ketones, etc.) in order to participate in an aldol condensation reaction. A dehydrogenation catalyst may be included to effect dehydrogenation of any alcohols, diols, or polyols present to form ketones and aldehydes. The dehydration catalyst is typically formed from the same metals as used for hydrogenation, hydrogenolysis, or aqueous phase reforming, which catalysts are described in more detail above. Dehydrogenation yields are enhanced by the removal or consumption of hydrogen as it forms during the reaction. The dehydrogenation step may be carried out as a separate reaction step before an aldol condensation reaction, or the dehydrogenation reaction may be carried out in concert with the aldol condensation reaction. For concerted dehydrogenation and aldol condensation, the dehydrogenation and aldol condensation functions can be on the same catalyst. For example, a metal hydrogenation/dehydrogenation functionality may be present on catalyst comprising a basic functionality.

The dehydrogenation reaction may result in the production of a carbonyl-containing compound. Suitable carbonyl-containing compounds include, but are not limited to, any compound comprising a carbonyl functional group that can form carbanion species or can react in a condensation reaction with a carbanion species, where "carbonyl" is defined as a carbon atom doubly-bonded to oxygen. In an embodiment, a carbonyl-containing compound can include, but is not limited to, ketones, aldehydes, furfurals, hydroxy carboxylic acids, and, carboxylic acids. The ketones may include, without limitation, hydroxyketones, cyclic ketones, diketones, acetone, propanone, 2-oxopropanal, butanone, butane-2,3-dione, 3-hydroxybutane-2-one, pentanone, cyclopentanone, pentane-2,3-dione, pentane-2,4-dione, hexanone, cyclohexanone, 2-methyl-cyclopentanone, heptanone, octanone, nonanone, decanone, undecanone, dodecanone, methylglyoxal, butanedione, pentanedione, diketohexane, dihydroxyacetone, and isomers thereof. The aldehydes may include, without limitation, hydroxyaldehydes, acetaldehyde, glyceraldehyde, propionaldehyde, butyraldehyde, pentanal, hexanal, heptanal, octanal, nonal, decanal, undecanal, dodecanal, and isomers thereof. The carboxylic acids may include, without limitation, formic acid, acetic acid, propionic acid, butanoic acid, pentanoic acid, hexanoic acid, heptanoic acid, isomers and derivatives thereof, including hydroxylated derivatives, such as 2-hydroxybutanoic acid and lactic acid. Furfurals include, without limitation, hydroxylmethylfurfural, 5-hydroxymethyl-2 (5H)-furanone, dihydro-5-(hydroxymethyl)-2(3H)-furanone, tetrahydro-2-furoic acid, dihydro-5-(hydroxymethyl)-2(3H)-furanone, tetrahydrofurfuryl alcohol, 1-(2-furyl)ethanol, hydroxymethyltetrahydrofurfural, and isomers thereof. In an embodiment, the dehydrogenation reaction results in the production of a carbonyl-containing compound that is combined with the oxygenated intermediates to become a part of the oxygenated intermediates fed to the condensation reaction.

In an embodiment, an acid catalyst may be used to optionally dehydrate at least a portion of the oxygenated intermediate stream. Suitable acid catalysts for use in the dehydration reaction include, but are not limited to, mineral acids (e.g., HCl, $H_2SO_4$), solid acids (e.g., zeolites, ion-exchange resins) and acid salts (e.g., $LaCl_3$). Additional acid catalysts may include, without limitation, zeolites, carbides, nitrides, zirconia, alumina, silica, aluminosilicates, phosphates, titanium oxides, zinc oxides, vanadium oxides, lanthanum oxides, yttrium oxides, scandium oxides, magnesium oxides, cerium oxides, barium oxides, calcium oxides, hydroxides, heteropolyacids, inorganic acids, acid modified resins, base modified resins, and any combination thereof. In some embodiments, the dehydration catalyst can also include a modifier. Suitable modifiers include La, Y, Sc, P, B, Bi, Li, Na, K, Rb, Cs, Mg, Ca, Sr, Ba, and any combination thereof. The modifiers may be useful, inter alia, to carry out a concerted hydrogenation/dehydrogenation reaction with the dehydration reaction. In some embodiments, the dehydration catalyst can also include a metal. Suitable metals include Cu, Ag, Au, Pt, Ni, Fe, Co, Ru, Zn, Cd, Ga, In, Rh, Pd, Ir, Re, Mn, Cr, Mo, W, Sn, Os, alloys, and any combination thereof. The dehydration catalyst may be self supporting, supported on an inert support or resin, or it may be dissolved in solution.

In some embodiments, the dehydration reaction occurs in the vapor phase. In other embodiments, the dehydration reaction occurs in the liquid phase. For liquid phase dehydration reactions, an aqueous solution may be used to carry out the reaction. In an embodiment, other solvents in addition to water, are used to form the aqueous solution. For example, water soluble organic solvents may be present. Suitable solvents can include, but are not limited to, hydroxymethylfurfural (HMF), dimethylsulfoxide (DMSO), 1-methyl-n-pyrollidone (NMP), and any combination thereof. Other suitable aprotic solvents may also be used alone or in combination with any of these solvents.

In an embodiment, the processing reactions may comprise an optional ketonization reaction. A ketonization reaction may increase the number of ketone functional groups within at least a portion of the oxygenated intermediate stream. For example, an alcohol or other hydroxyl functional group can be converted into a ketone in a ketonization reaction. Ketonization may be carried out in the presence of a base catalyst. Any of the base catalysts described above as the basic component of the aldol condensation reaction can be used to effect a ketonization reaction. Suitable reaction conditions are known to one of ordinary skill in the art and generally correspond to the reaction conditions listed above with respect to the aldol condensation reaction. The ketonization reaction may be carried out as a separate reaction step, or it may be carried out in concert with the aldol condensation reaction. The inclusion of a basic functional site on the aldol condensation catalyst may result in concerted ketonization and aldol condensation reactions.

In an embodiment, the processing reactions may comprise an optional furanic ring opening reaction. A furanic ring opening reaction may result in the conversion of at least a portion of any oxygenated intermediates comprising a furanic ring into compounds that are more reactive in an aldol condensation reaction. A furanic ring opening reaction may be carried out in the presence of an acidic catalyst. Any of the acid catalysts described above as the acid component of the aldol condensation reaction can be used to effect a furanic ring opening reaction. Suitable reaction conditions are known to one of ordinary skill in the art and generally correspond to the reaction conditions listed above with respect to the aldol condensation reaction. The furanic ring opening reaction may be carried out as a separate reaction step, or it may be carried out in concert with the aldol condensation reaction. The inclusion of an acid functional site on the aldol condensation catalyst may result in a concerted furanic ring opening reaction and aldol condensation reactions. Such an embodiment may be advantageous as any furanic rings can be opened in the presence of an acid functionality and reacted in an aldol condensation reaction using a base functionality. Such a concerted reaction scheme may allow for the production of a greater amount of higher hydrocarbons to be formed for a given oxygenated intermediate feed.

In an embodiment, production of a $C_{4+}$ compound occurs by condensation, which may include aldol-condensation, of the oxygenated intermediates in the presence of a condensation catalyst. Aldol-condensation generally involves the carbon-carbon coupling between two compounds, at least one of which may contain a carbonyl group, to form a larger organic molecule. For example, acetone may react with hydroxymethylfurfural to form a $C_9$ species, which may subsequently react with another hydroxymethylfurfural molecule to form a $C_{15}$ species. The reaction is usually carried out in the presence of a condensation catalyst. The condensation reaction may be carried out in the vapor or liquid phase. In an embodiment, the reaction may take place at a temperature in the range of from about 7 degrees C. to about 377 degrees C., depending on the reactivity of the carbonyl group.

The condensation catalyst will generally be a catalyst capable of forming longer chain compounds by linking two molecules through a new carbon-carbon bond, such as a basic catalyst, a multi-functional catalyst having both acid and base functionality, or either type of catalyst also comprising an optional metal functionality. In an embodiment, the multi-functional catalyst will be a catalyst having both a strong acid and a strong base functionality. In an embodiment, aldol catalysts can comprise Li, Na, K, Cs, B, Rb, Mg, Ca, Sr, Si, Ba, Al, Zn, Ce, La, Y, Sc, Y, Zr, Ti, hydrotalcite, zinc-aluminate, phosphate, base-treated aluminosilicate zeolite, a basic resin, basic nitride, alloys or any combination thereof. In an embodiment, the base catalyst can also comprise an oxide of Ti, Zr, V, Nb, Ta, Mo, Cr, W, Mn, Re, Al, Ga, In, Co, Ni, Si, Cu, Zn, Sn, Cd, Mg, P, Fe, or any combination thereof. In an embodiment, the condensation catalyst comprises mixed-oxide base catalysts. Suitable mixed-oxide base catalysts can comprise a combination of magnesium, zirconium, and oxygen, which may comprise, without limitation: Si—Mg—O, Mg—Ti—O, Y—Mg—O, Y—Zr—O, Ti—Zr—O, Ce—Zr—O, Ce—Mg—O, Ca—Zr—O, La—Zr—O, B—Zr—O, La—Ti—O, B—Ti—O, and any combinations thereof. Different atomic ratios of Mg/Zr or the combinations of various other elements constituting the mixed oxide catalyst may be used ranging from about 0.01 to about 50. In an embodiment, the condensation catalyst further includes a metal or alloys comprising metals, such as Cu, Ag, Au, Pt, Ni, Fe, Co, Ru, Zn, Cd, Ga, In, Rh, Pd, Ir, Re, Mn, Cr, Mo, W, Sn, Bi, Pb, Os, alloys and combinations thereof. Such metals may be preferred when a dehydrogenation reaction is to be carried out in concert with the aldol condensation reaction. In an embodiment, preferred Group IA materials include Li, Na, K, Cs and Rb. In an embodiment, preferred Group IIA materials include Mg, Ca, Sr and Ba. In an embodiment, Group IIB materials include Zn and Cd. In an embodiment, Group IIIB materials include Y and La. Basic resins include resins that exhibit basic functionality. The base catalyst may be self-supporting or adhered to any one of the supports further described below, including supports containing carbon, silica, alumina, zirconia, titania, vanadia, ceria, nitride, boron nitride, heteropolyacids, alloys and mixtures thereof.

In one embodiment, the condensation catalyst is derived from the combination of MgO and $Al_2O_3$ to form a hydrotalcite material. Another preferred material contains ZnO and $Al_2O_3$ in the form of a zinc aluminate spinel. Yet another preferred material is a combination of ZnO, $Al_2O_3$, and CuO. Each of these materials may also contain an additional metal function provided by a Group VIIIB metal, such as Pd or Pt. Such metals may be preferred when a dehydrogenation reaction is to be carried out in concert with the aldol condensation reaction. In one embodiment, the base catalyst is a metal oxide containing Cu, Ni, Zn, V, Zr, or mixtures thereof. In another embodiment, the base catalyst is a zinc aluminate metal containing Pt, Pd Cu, Ni, or mixtures thereof.

Preferred loading of the primary metal in the condensation catalyst is in the range of 0.10 wt % to 25 wt %, with weight percentages of 0.10% and 0.05% increments between, such as 1.00%, 1.10%, 1.15%, 2.00%, 2.50%, 5.00%, 10.00%, 12.50%, 15.00% and 20.00%. The preferred atomic ratio of the second metal, if any, is in the range of 0.25-to-1 to 10-to-1, including ratios there between, such as 0.50, 1.00, 2.50, 5.00, and 7.50-to-1.

In some embodiments, the base catalyzed condensation reaction is performed using a condensation catalyst with both an acid and base functionality. The acid-aldol condensation catalyst may comprise hydrotalcite, zinc-aluminate, phosphate, Li, Na, K, Cs, B, Rb, Mg, Si, Ca, Sr, Ba, Al, Ce, La, Sc, Y, Zr, Ti, Zn, Cr, or any combination thereof. In further embodiments, the acid-base catalyst may also include one or more oxides from the group of Ti, Zr, V, Nb, Ta, Mo, Cr, W, Mn, Re, Al, Ga, In, Fe, Co, Ir, Ni, Si, Cu, Zn, Sn, Cd, P, and combinations thereof. In an embodiment, the acid-base catalyst includes a metal functionality provided by Cu, Ag, Au, Pt, Ni, Fe, Co, Ru, Zn, Cd, Ga, In, Rh, Pd, Ir, Re, Mn, Cr, Mo, W, Sn, Os, alloys or combinations thereof. In one embodiment, the catalyst further includes Zn, Cd or phosphate. In one embodiment, the condensation catalyst is a metal oxide containing Pd, Pt, Cu or Ni, and even more preferably an aluminate or zirconium metal oxide containing Mg and Cu, Pt, Pd or Ni. The acid-base catalyst may also include a hydroxyapatite (HAP) combined with any one or more of the above metals. The acid-base catalyst may be self-supporting or adhered to any one of the supports further described below, including supports containing carbon, silica, alumina, zirconia, titania, vanadia, ceria, nitride, boron nitride, heteropolyacids, alloys and mixtures thereof.

In an embodiment, the condensation catalyst may also include zeolites and other microporous supports that contain Group IA compounds, such as Li, NA, K, Cs and Rb. Preferably, the Group IA material is present in an amount less than that required to neutralize the acidic nature of the support. A metal function may also be provided by the addition of group VIIIB metals, or Cu, Ga, In, Zn or Sn. In one embodiment, the condensation catalyst is derived from the combination of MgO and $Al_2O_3$ to form a hydrotalcite material. Another preferred material contains a combination of MgO and $ZrO_2$, or a combination of ZnO and $Al_2O_3$. Each of these materials may also contain an additional metal function provided by copper or a Group VIIIB metal, such as Ni, Pd, Pt, or combinations of the foregoing.

If a Group IIB, VIIB, VIIB, VIIIB, IIA or IVA metal is included in the condensation catalyst, the loading of the metal is in the range of 0.10 wt % to 10 wt %, with weight percentages of 0.10% and 0.05% increments between, such as 1.00%, 1.10%, 1.15%, 2.00%, 2.50%, 5.00% and 7.50%, etc. If a second metal is included, the preferred atomic ratio of the second metal is in the range of 0.25-to-1 to 5-to-1, including ratios there between, such as 0.50, 1.00, 2.50 and 5.00-to-1.

The condensation catalyst may be self-supporting (i.e., the catalyst does not need another material to serve as a support), or may require a separate support suitable for suspending the catalyst in the reactant stream. One exemplary support is silica, especially silica having a high surface area (greater than 100 square meters per gram), obtained by sol-gel synthesis, precipitation, or fuming. In other embodiments, particularly when the condensation catalyst is a powder, the catalyst system may include a binder to assist in forming the catalyst into a desirable catalyst shape. Applicable forming processes include extrusion, pelletization, oil dropping, or other known processes Zinc oxide, alumina, and a peptizing agent may also be mixed together and extruded to produce a formed material. After drying, this material is calcined at a temperature appropriate for formation of the catalytically active phase, which usually requires temperatures in excess of 452 degrees C. Other catalyst supports as known to those of ordinary skill in the art may also be used.

In some embodiments, a dehydration catalyst, a dehydrogenation catalyst, and the condensation catalyst can be present in the same reactor as the reaction conditions overlap to some degree. In these embodiments, a dehydration reaction and/or a dehydrogenation reaction may occur substantially simultaneously with the condensation reaction. In some embodiments, a catalyst may comprise active sites for a dehydration reaction and/or a dehydrogenation reaction in addition to a condensation reaction. For example, a catalyst may comprise active metals for a dehydration reaction and/or a dehydrogenation reaction along with a condensation reaction at separate sites on the catalyst or as alloys. Suitable active elements can comprise any of those listed above with respect to the dehydration catalyst, dehydrogenation catalyst, and the condensation catalyst. Alternately, a physical mixture of dehydration, dehydrogenation, and condensation catalysts could be employed. While not intending to be limited by theory, it is believed that using a condensation catalyst comprising a metal and/or an acid functionality may assist in pushing the equilibrium limited aldol condensation reaction towards completion. Advantageously, this can be used to effect multiple condensation reactions with dehydration and/or dehydrogenation of intermediates, in order to form (via condensation, dehydration, and/or dehydrogenation) higher molecular weight oligomers as desired to produce jet or diesel fuel.

The specific C4+ compounds produced in the condensation reaction will depend on various factors, including, without limitation, the type of oxygenated intermediates in the reactant stream, condensation temperature, condensation pressure, the reactivity of the catalyst, and the flow rate of the reactant stream as it affects the space velocity, GHSV and WHSV. Preferably, the reactant stream is contacted with the condensation catalyst at a WHSV that is appropriate to produce the desired hydrocarbon products. The WHSV is preferably at least about 0.1 grams of oxygenated intermediates in the reactant stream per hour, more preferably the WHSV is between about 0.1 to 40.0 g/g hr, including a WHSV of about 1, 2, 3, 4, 5, 6, 7, 8, 9, 10, 11, 12, 13, 14, 15, 20, 25, 30, 35 g/g hr, and increments between.

In general, the condensation reaction should be carried out at a temperature at which the thermodynamics of the proposed reaction are favorable. For condensed phase liquid reactions, the pressure within the reactor must be sufficient to maintain at least a portion of the reactants in the condensed liquid phase at the reactor inlet. For vapor phase reactions, the reaction should be carried out at a temperature where the vapor pressure of the oxygenates is at least about 10 kPa, and the thermodynamics of the reaction are favorable. The condensation temperature will vary depending upon the specific oxygenated intermediates used, but is generally in the range of from about 77 degrees C. to 502 degrees C. for reactions taking place in the vapor phase, and more preferably from about 127 degrees C. to 452 degrees C. For liquid phase reactions, the condensation temperature may be from about 7 degrees C. to 477 degrees C., and the condensation pressure from about 0.1 kPa to 10,000 kPa. Preferably, the condensation temperature is between about 17 degrees C. and 302 degrees C., or between about 17 degrees C. and 252 degrees C. for difficult substrates.

Varying the factors above, as well as others, will generally result in a modification to the specific composition and yields of the $C_{4+}$ compounds. For example, varying the temperature and/or pressure of the reactor system, or the particular catalyst formulations, may result in the production of $C_{4+}$ alcohols and/or ketones instead of $C_{4+}$ hydrocarbons. The $C_{4+}$ hydrocarbon product may also contain a variety of olefins, and alkanes of various sizes (typically branched alkanes). Depending upon the condensation catalyst used, the hydrocarbon product may also include aromatic and cyclic hydrocarbon compounds. The $C_{4+}$ hydrocarbon product may also contain undesirably high levels of olefins, which may lead to coking or deposits in combustion engines, or other undesirable hydrocarbon products. In such event, the hydrocarbon molecules produced may be optionally hydrogenated to reduce the ketones to alcohols and hydrocarbons, while the alcohols and unsaturated hydrocarbon may be reduced to alkanes, thereby forming a more desirable hydrocarbon product having low levels of olefins, aromatics or alcohols.

The condensation reactions may be carried out in any reactor of suitable design, including continuous-flow, batch, semi-batch or multi-system reactors, without limitation as to design, size, geometry, flow rates, etc. The reactor system may also use a fluidized catalytic bed system, a swing bed system, fixed bed system, a moving bed system, or a combination of the above. In some embodiments, bi-phasic (e.g., liquid-liquid) and tri-phasic (e.g., liquid-liquid-solid) reactors may be used to carry out the condensation reactions.

In a continuous flow system, the reactor system can include an optional dehydrogenation bed adapted to produce dehydrogenated oxygenated intermediates, an optional dehydration bed adapted to produce dehydrated oxygenated intermediates, and a condensation bed to produce $C_{4+}$ compounds from the oxygenated intermediates. The dehydrogenation bed is configured to receive the reactant stream and produce the desired oxygenated intermediates, which may have an increase in the amount of carbonyl-containing compounds. The de-hydration bed is configured to receive the reactant stream and produce the desired oxygenated intermediates. The condensation bed is configured to receive the oxygenated intermediates for contact with the condensation catalyst and production of the desired $C_{4+}$ compounds. For systems with one or more finishing steps, an additional reaction bed for conducting the finishing process or processes may be included after the condensation bed.

In an embodiment, the optional dehydration reaction, the optional dehydrogenation reaction, the optional ketonization reaction, the optional ring opening reaction, and the condensation reaction catalyst beds may be positioned within the same reactor vessel or in separate reactor vessels in fluid communication with each other. Each reactor vessel preferably includes an outlet adapted to remove the product stream from the reactor vessel. For systems with one or more finishing steps, the finishing reaction bed or beds may be within the same reactor vessel along with the condensation bed or in a separate reactor vessel in fluid communication with the reactor vessel having the condensation bed.

In an embodiment, the reactor system also includes additional outlets to allow for the removal of portions of the reactant stream to further advance or direct the reaction to the desired reaction products, and to allow for the collection and recycling of reaction byproducts for use in other portions of the system. In an embodiment, the reactor system also includes additional inlets to allow for the introduction of supplemental materials to further advance or direct the reaction to the desired reaction products, and to allow for the recycling of reaction byproducts for use in other reactions.

In an embodiment, the reactor system also includes elements which allow for the separation of the reactant stream into different components which may find use in different reaction schemes or to simply promote the desired reactions. For instance, a separator unit, such as a phase separator, extractor, purifier or distillation column, may be installed prior to the condensation step to remove water from the reactant stream for purposes of advancing the condensation reaction to favor the production of higher hydrocarbons. In an embodiment, a separation unit is installed to remove specific intermediates to allow for the production of a desired product stream containing hydrocarbons within a particular carbon number range, or for use as end products or in other systems or processes.

The condensation reaction can produce a broad range of compounds with carbon numbers ranging from C4 to C30 or greater. Exemplary compounds include, but are not limited to, C4+ alkanes, C4+ alkenes, C5+ cycloalkanes, C5+ cycloalkenes, aryls, fused aryls, C4+ alcohols, C4+ ketones, and mixtures thereof. The C4+ alkanes and C4+ alkenes may range from 4 to 30 carbon atoms (C4-C30 alkanes and C4-C30 alkenes) and may be branched or straight chained alkanes or alkenes. The C4+ alkanes and C4+ alkenes may also include fractions of C7-C14, C12-C24 alkanes and alkenes, respectively, with the C7-C14 fraction directed to jet fuel blend, and the C12-C24 fraction directed to a diesel fuel blend and other industrial applications. Examples of various C4+ alkanes and C4+ alkenes include, without limitation, butane, butene, pentane, pentene, 2-methylbutane, hexane, hexene, 2-methylpentane, 3-methylpentane, 2,2-dimethylbutane, 2,3-dimethylbutane, heptane, heptene, octane, octene, 2,2,4,-trimethylpentane, 2,3-dimethyl hexane, 2,3,4-trimethylpentane, 2,3-dimethylpentane, nonane, nonene, decane, decene, undecane, undecene, dodecane, dodecene, tridecane, tridecene, tetradecane, tetradecene, pentadecane, pentadecene, hexadecane, hexadecene, heptyldecane, heptyldecene, octyldecane, octyldecene, nonyldecane, nonyldecene, eicosane, eicosene, uneicosane, uneicosene, doeicosane, doeicosene, trieicosane, trieicosene, tetraeicosane, tetraeicosene, and isomers thereof.

The C5+ cycloalkanes and C5+ cycloalkenes have from 5 to 30 carbon atoms and may be unsubstituted, mono-substituted or multi-substituted. In the case of mono-substituted and multi-substituted compounds, the substituted group may include a branched C3+ alkyl, a straight chain C1+ alkyl, a branched C3+ alkylene, a straight chain C1+ alkylene, a straight chain C2+ alkylene, a phenyl or a combination thereof. In one embodiment, at least one of the substituted groups include a branched C3-C12 alkyl, a straight chain C1-C12 alkyl, a branched C3-C12 alkylene, a straight chain C1-C12 alkylene, a straight chain C2-C12 alkylene, a phenyl or a combination thereof. In yet another embodiment, at least one of the substituted groups includes a branched C3-C4 alkyl, a straight chain C1-C4 alkyl, a branched C3-C4 alkylene, a straight chain C1-C4 alkylene, a straight chain C2-C4 alkylene, a phenyl, or any combination thereof. Examples of desirable C5+ cycloalkanes and C5+ cycloalkenes include, without limitation, cyclopentane, cyclopentene, cyclohexane, cyclohexene, methyl-cyclopentane, methyl-cyclopentene, ethyl-cyclopentane, ethyl-cyclopentene, ethyl-cyclohexane, ethyl-cyclohexene, and isomers thereof.

Aryls will generally consist of an aromatic hydrocarbon in either an unsubstituted (phenyl), mono-substituted or multi-substituted form. In the case of mono-substituted and multi-substituted compounds, the substituted group may include a branched C3+ alkyl, a straight chain C1+ alkyl, a branched C3+ alkylene, a straight chain C2+ alkylene, a phenyl or a combination thereof. In one embodiment, at least one of the substituted groups includes a branched C3-C12 alkyl, a straight chain C1-C12 alkyl, a branched C3-C12 alkylene, a straight chain C2-C12 alkylene, a phenyl, or any combination thereof. In yet another embodiment, at least one of the substituted groups includes a branched C3-C4 alkyl, a straight chain C1-C4 alkyl, a branched C3-C4 alkylene, straight chain C2-C4 alkylene, a phenyl, or any combination thereof. Examples of various aryls include, without limitation, benzene, toluene, xylene (dimethylbenzene), ethyl benzene, para xylene, meta xylene, ortho xylene, C9 aromatics.

Fused aryls will generally consist of bicyclic and polycyclic aromatic hydrocarbons, in either an unsubstituted, mono-substituted or multi-substituted form. In the case of mono-substituted and multi-substituted compounds, the substituted group may include a branched C3+ alkyl, a straight chain C1+ alkyl, a branched C3+ alkylene, a straight chain C2+ alkylene, a phenyl or a combination thereof. In another embodiment, at least one of the substituted groups includes a branched C3-C4 alkyl, a straight chain C1-C4 alkyl, a branched C3-C4 alkylene, a straight chain C2-C4 alkylene, a phenyl, or any combination thereof. Examples of various fused aryls include, without limitation, naphthalene, anthracene, tetrahydronaphthalene, and decahydronaphthalene, indane, indene, and isomers thereof.

The moderate fractions, such as C7-C14, may be separated for jet fuel, while heavier fractions, (e.g., C12-C24), may be separated for diesel use. The heaviest fractions may be used as lubricants or cracked to produce additional gasoline and/or diesel fractions. The C4+ compounds may also find use as industrial chemicals, whether as an intermediate or an end product. For example, the aryls toluene, xylene, ethyl benzene, para xylene, meta xylene, ortho xylene may find use as chemical intermediates for the production of plastics and other products. Meanwhile, the C9 aromatics and fused aryls, such as naphthalene, anthracene, tetrahydronaphthalene, and decahydronaphthalene, may find use as solvents in industrial processes.

In an embodiment, additional processes are used to treat the fuel blend to remove certain components or further conform the fuel blend to a diesel or jet fuel standard. Suitable techniques include hydrotreating to reduce the amount of or remove any remaining oxygen, sulfur, or nitrogen in the fuel blend. The conditions for hydrotreating a hydrocarbon stream are known to one of ordinary skill in the art.

In an embodiment, hydrogenation is carried out in place of or after the hydrotreating process to saturate at least some olefinic bonds. In some embodiments, a hydrogenation reaction may be carried out in concert with the aldol condensation reaction by including a metal functional group with the aldol condensation catalyst. Such hydrogenation may be performed to conform the fuel blend to a specific fuel standard (e.g., a diesel fuel standard or a jet fuel standard). The hydrogenation of the fuel blend stream can be carried out according to known procedures, either with the continuous or batch method. The hydrogenation reaction may be used to remove a remaining carbonyl group or hydroxyl group. In such event, any one of the hydrogenation catalysts described above may be used. Such catalysts may include any one or more of the following metals, Cu, Ni, Fe, Co, Ru, Pd, Rh, Pt, Ir, Os, alloys or combinations thereof, alone or with promoters such as Au, Ag, Cr, Zn, Mn, Sn, Cu, Bi, and alloys thereof, may be used in various loadings ranging from about 0.01 wt % to about 20 wt % on a support as described above. In general, the finishing step is carried out at finishing temperatures of between about 80 degrees C. to 250 degrees C., and finishing pressures in the range of about 700 kPa to 15,000 kPa. In one embodiment, the finishing step is conducted in the vapor phase or liquid phase, and uses, external $H_2$, recycled $H_2$, or combinations thereof, as necessary.

In an embodiment, isomerization is used to treat the fuel blend to introduce a desired degree of branching or other shape selectivity to at least some components in the fuel blend. It may be useful to remove any impurities before the hydrocarbons are contacted with the isomerization catalyst. The isomerization step comprises an optional stripping step, wherein the fuel blend from the oligomerization reaction may be purified by stripping with water vapor or a suitable gas such as light hydrocarbon, nitrogen or hydrogen. The optional stripping step is carried out in a counter-current manner in a unit upstream of the isomerization catalyst, wherein the gas and liquid are contacted with each other, or before the actual isomerization reactor in a separate stripping unit utilizing counter-current principle.

After the optional stripping step the fuel blend can be passed to a reactive isomerization unit comprising one or several catalyst bed(s). The catalyst beds of the isomerization step may operate either in co-current or counter-current manner. In the isomerization step, the pressure may vary from 2000 kPa to 15,000 kPa, preferably in the range of 2000 kPa to 10,000 kPa, the temperature being between 197 degrees C. and 502 degrees C., preferably between 302 degrees C. and 402 degrees C. In the isomerization step, any isomerization catalysts known in the art may be used. Suitable isomerization catalysts can contain molecular sieve and/or a metal from Group VII and/or a carrier. In an embodiment, the isomerization catalyst contains SAPO-11 or SAPO41 or ZSM-22 or ZSM-23 or ferrierite and Pt, Pd or Ni and $Al_2O_3$ or $SiO_2$. Typical isomerization catalysts are, for example, Pt/SAPO-11/$Al_2O_3$, Pt/ZSM-22/$Al_2O_3$, Pt/ZSM-23/$Al_2O_3$ and Pt/SAPO-11/$SiO_2$.

Other factors, such as the concentration of water or undesired oxygenated intermediates, may also effect the composition and yields of the C4+ compounds, as well as the activity and stability of the condensation catalyst. In such event, the process may include a dewatering step that removes a portion of the water prior to the condensation reaction and/or the optional dehydration reaction, or a separation unit for removal of the undesired oxygenated intermediates. For instance, a separator unit, such as a phase separator, extractor, purifier or distillation column, may be installed prior to the condensation step so as to remove a portion of the water from the reactant stream containing the oxygenated intermediates. A separation unit may also be installed to remove specific oxygenated intermediates to allow for the production of a desired product stream containing hydrocarbons within a particular carbon range, or for use as end products or in other systems or processes.

Thus, in one embodiment, the fuel blend produced by the processes described herein is a hydrocarbon mixture that meets the requirements for jet fuel (e.g., conforms with ASTM D1655). In another embodiment, the product of the processes described herein is a hydrocarbon mixture that comprises a fuel blend meeting the requirements for a diesel fuel (e.g., conforms with ASTM D975).

Yet in another embodiment of the invention, the $C_{2+}$ olefins are produced by catalytically reacting the oxygenated intermediates in the presence of a dehydration catalyst at a dehydration temperature and dehydration pressure to produce a reaction stream comprising the $C_{2+}$ olefins. The $C_{2+}$ olefins comprise straight or branched hydrocarbons containing one or more carbon-carbon double bonds. In general, the $C_{2+}$ olefins contain from 2 to 8 carbon atoms, and more preferably from 3 to 5 carbon atoms. In one embodiment, the olefins comprise propylene, butylene, pentylene, isomers of the foregoing, and mixtures of any two or more of the foregoing. In another embodiment, the $C_{2+}$ olefins include $C_{4+}$ olefins produced by catalytically reacting a portion of the $C_{2+}$ olefins over an olefin isomerization catalyst. In an embodiment, a method of forming a fuel blend from a biomass feedstock may comprise a digester that receives a biomass feedstock and a digestive solvent operating under conditions to effectively remove nitrogen and sulfur compounds from said biomass feedstock and discharges a treated stream comprising a carbohydrate having less than 35% of the sulfur content and less than 35% of the nitrogen content based on the untreated biomass feedstock on a dry mass basis; a hydrogenolysis reactor comprising a hydrogenolysis catalyst that receives the treated stream and discharges an oxygenated intermediate, wherein a first portion of the oxygenated intermediate stream is recycled to the digester as at least a portion of the digestive solvent; a first fuels processing reactor comprising a dehydrogenation catalyst that receives a second portion of the oxygenated intermediate stream and discharges an olefin-containing stream; and a second fuels processing reactor comprising an alkylation catalyst that receives the olefin-containing stream and discharges a liquid fuel.

The dehydration catalyst comprises a member selected from the group consisting of an acidic alumina, aluminum phosphate, silica-alumina phosphate, amorphous silica-alumina, aluminosilicate, zirconia, sulfated zirconia, tungstated zirconia, tungsten carbide, molybdenum carbide, titania, sulfated carbon, phosphated carbon, phosphated silica, phosphated alumina, acidic resin, heteropolyacid, inorganic acid, and a combination of any two or more of the foregoing. In one embodiment, the dehydration catalyst further comprises a modifier selected from the group consisting of Ce, Y, Sc, La, Li, Na, K, Rb, Cs, Mg, Ca, Sr, Ba, P, B, Bi, and a combination of any two or more of the foregoing. In another embodiment, the dehydration catalyst further comprises an oxide of an element, the element selected from the group consisting of Ti, Zr, V, Nb, Ta, Mo, Cr, W, Mn, Re, Al, Ga, In, Fe, Co, Ir, Ni, Si, Cu, Zn, Sn, Cd, P, and a combination of any two or more of the foregoing. In yet another embodiment, the dehydration catalyst further comprises a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

In yet another embodiment, the dehydration catalyst comprises an aluminosilicate zeolite. In one version, the dehydration catalyst further comprises a modifier selected from the group consisting of Ga, In, Zn, Fe, Mo, Ag, Au, Ni, P, Sc, Y, Ta, a lanthanide, and a combination of any two or more of the foregoing. In another version, the dehydration catalyst further comprises a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

In another embodiment, the dehydration catalyst comprises a bifunctional pentasil ring-containing aluminosilicate zeolite. In one version, the dehydration catalyst further comprises a modifier selected from the group consisting of Ga, In, Zn, Fe, Mo, Ag, Au, Ni, P, Sc, Y, Ta, a lanthanide, and a combination of any two or more of the foregoing. In another version, the dehydration catalyst further comprises a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

The dehydration reaction is conducted at a temperature and pressure where the thermodynamics are favorable. In general, the reaction may be performed in the vapor phase, liquid phase, or a combination of both. In one embodiment, the dehydration temperature is in the range of about 100 degrees C. to 500 degrees C., and the dehydration pressure is in the range of about 0 psig to 900 psig. In another embodiment, the dehydration temperature is in the range of about 125 degrees C. to 450 degrees C., and the dehydration pressure is at least 2 psig. In another version, the dehydration temperature is in the range of about 150 degrees C. to 350 degrees C., and the dehydration pressure is in the range of about 100 psig to 800 psig. In yet another version, the dehydration temperature is in the range of about 175 degrees C. to 325 degrees C.

The $C_{6+}$ paraffins are produced by catalytically reacting the $C_{2+}$ olefins with a stream of $C_{4+}$ isoparaffins in the presence of an alkylation catalyst at an alkylation temperature and alkylation pressure to produce a product stream comprising $C_{6+}$ paraffins. The $C_{4+}$ isoparaffins include alkanes and cycloalkanes having 4 to 7 carbon atoms, such as isobutane, isopentane, naphthenes, and higher homologues having a tertiary carbon atom (e.g., 2-methylbutane and 2,4-dimethylpentane), isomers of the foregoing, and mixtures of any two or more of the foregoing. In one embodiment, the stream of $C_{4+}$ isoparaffins comprises of internally generated $C_{4+}$ isoparaffins, external $C_{4+}$ isoparaffins, recycled $C_{4+}$ isoparaffins, or combinations of any two or more of the foregoing.

The $C_{6+}$ paraffins will generally be branched paraffins, but may also include normal paraffins. In one version, the $C_{6+}$ paraffins comprises a member selected from the group consisting of a branched $C_{6-10}$ alkane, a branched $C_6$ alkane, a branched $C_7$ alkane, a branched $C_8$ alkane, a branched $C_9$ alkane, a branched $C_{10}$ alkane, or a mixture of any two or more of the foregoing. In one version, the $C_{6+}$ paraffins comprise dimethylbutane, 2,2-dimethylbutane, 2,3-dimethylbutane, methylpentane, 2-methylpentane, 3-methylpentane, dimethylpentane, 2,3-dimethylpentane, 2,4-dimethylpentane, methylhexane, 2,3-dimethylhexane, 2,3,4-trimethylpentane, 2,2,4-trimethylpentane, 2,2,3-trimethylpentane, 2,3,3-trimethylpentane, dimethylhexane, or mixtures of any two or more of the foregoing.

The alkylation catalyst comprises a member selected from the group of sulfuric acid, hydrofluoric acid, aluminum chloride, boron trifluoride, solid phosphoric acid, chlorided alumina, acidic alumina, aluminum phosphate, silica-alumina phosphate, amorphous silica-alumina, aluminosilicate, aluminosilicate zeolite, zirconia, sulfated zirconia, tungstated zirconia, tungsten carbide, molybdenum carbide, titania, sulfated carbon, phosphated carbon, phosphated silica, phosphated alumina, acidic resin, heteropolyacid, inorganic acid, and a combination of any two or more of the foregoing. The alkylation catalyst may also include a mixture of a mineral acid with a Friedel-Crafts metal halide, such as aluminum bromide, and other proton donors.

In one embodiment, the alkylation catalyst comprises an aluminosilicate zeolite. In one version, the alkylation catalyst further comprises a modifier selected from the group consisting of Ga, In, Zn, Fe, Mo, Ag, Au, Ni, P, Sc, Y, Ta, a lanthanide, and a combination of any two or more of the foregoing. In another version, the alkylation catalyst further comprises a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing.

In another embodiment, the alkylation catalyst comprises a bifunctional pentasil ring-containing aluminosilicate zeolite. In one version, the alkylation catalyst further comprises a modifier selected from the group consisting of Ga, In, Zn, Fe, Mo, Ag, Au, Ni, P, Sc, Y, Ta, a lanthanide, and a combination of any two or more of the foregoing. In another version, the alkylation catalyst further comprises a metal selected from the group consisting of Cu, Ag, Au, Pt, Ni, Fe, Co, Ru, Zn, Cd, Ga, In, Rh, Pd, Ir, Re, Mn, Cr, Mo, W, Sn, Os, an alloy of any two or more of the foregoing, and a combination of any two or more of the foregoing. In one version, the dehydration catalyst and the alkylation catalyst are atomically identical.

The alkylation reaction is conducted at a temperature where the thermodynamics are favorable. In general, the alkylation temperature is in the range of about −20 degrees C. to 300 degrees C., and the alkylation pressure is in the range of about 0 psig to 1200 psig. In one version, the alkylation temperature is in the range of about 100 degrees C. to 300 degrees C. In another version, the alkylation temperature is in the range of about 0 degrees C. to 100 degrees C., and the alkylation pressure is at least 100 psig. In yet another version, the alkylation temperature is in the range of about 0 degrees C. to 50 degrees C. and the alkylation pressure is less than 300 psig. In still yet another version, the alkylation temperature is in the range of about 70 degrees C. to 250 degrees C., and the alkylation pressure is in the range of about 100 psig to 1200 psig. In one embodiment, the alkylation catalyst comprises a mineral acid or a strong acid. In another embodiment, the alkylation catalyst comprises a zeolite and the alkylation temperature is greater than 100 degrees C.

In an embodiment of the present invention, the fuel yield of the current process may be greater than other bio-based feedstock conversion processes with substantially less loss of oxygenated product yield. It is believed that high void fraction supported metal catalyst substantially increase permeability (non-plugging) thus extending catalyst run life.

To facilitate a better understanding of the present invention, the following examples of certain aspects of some embodiments are given. In no way should the following examples be read to limit, or define, the entire scope of the invention.

EXAMPLES

Reaction studies were conducted in a Parr5000 Hastelloy multireactor comprising 6×75-milliliter reactors operated in parallel at pressures up to 135 bar, and temperatures up to 275 degrees C., stirred by magnetic stir bar. Alternate studies were conducted in 100-ml Parr4750 reactors, with mixing by top-driven stir shaft impeller, also capable of 135 bar and 275 degrees C. Larger scale extraction, pretreatment and digestion tests were conducted in a 1-Liter Parr reactor with annular basket housing biomass feed, or with filtered dip tube for direct contacting of biomass slurries.

Reaction samples were analyzed for sugar, polyol, and organic acids using an HPLC method entailing a Bio-Rad Aminex HPX-87H column (300 mm×7.8 mm) operated at 0.6 ml/minute of a mobile phase of 5 mM Sulfuric Acid in water, at an oven temperature of 30 degrees C., a run time of 70 minutes, and both RI and UV (320 nm) detectors.

Product formation (mono-oxygenates, glycols, diols, alkanes, acids) were monitored via a gas chromatographic (GC) method "DB5-ox", entailing a 60-m×0.32 mm ID DB-5 column of 1 μm thickness, with 50:1 split ratio, 2 ml/min helium flow, and column oven at 40 degrees C. for 8 minutes, followed by ramp to 285 degrees C. at 10 degrees C./min, and a hold time of 53.5 minutes. Injector temperature is set at 250 degrees C., and detector temperature at 300 degrees C.

Gasoline production potential by condensation was assessed via injection of one microliters of liquid intermediate product into a catalytic pulse microreactor entailing a GC insert packed with 0.12 grams of ZSM-5 catalyst, held at 375 degrees C., followed by Restek Rtx-1701 (60-m) and DB-5 (60-m) capillary GC columns in series (120-m total length, 0.32 mm ID, 0.25 μm film thickness) for an Agilent/HP 6890 GC equipped with flame ionization detector. Helium flow was 2.0 ml/min (constant flow mode), with a 10:1 split ratio. Oven temperature was held at 35 degrees C. for 10 minutes, followed by a ramp to 270 degrees C. at 3 degrees C./min, followed by a 1.67 minute hold time. Detector temperature was 300 degrees C.

Example 1

Digester with Hollow Cylinder Catalyst

A ½-inch diameter digester-reactor tube was packed with 6.1 grams of southern pine mini chips (31% moisture), nominal 8-mm×6-mm×3 mm 4.9-grams of SENTRY™ OptiTrap HC 3.2-mm diameter hollow cylinder catalyst (from Criterion Catalyst & Technologies L.P.) was packed on top of the wood chips. The catalyst comprised a nominal composition of s 6% Mo and 1.5% Ni, with a bulk density of 0.55 g/cc, and was pre-reduced under excess hydrogen flow with a temperature ramp from 25 to 400 degrees C. at 12.5 degrees C./hour, with a 2-hour hold at final temperature.

The digester-reactor was filled with solvent (45% by weight 1,2-propylene glycol, 5% ethylene glycol in deionized water with 0.05 wt % potassium carbonate buffer. Hydrogen flow was introduced at the bottom of the digester-reactor, and routed to a high pressure product vessel maintained at 69 bar via pressure regulator, before venting at 9.6 ml/min standard pressure and temperature (STP). The assembly was heated via band heaters (Gaumer) to 190 degrees C., before initiating solvent flow at 0.22 ml/min.

After 1.25 hours, temperature was ramped to 245 degrees C. and maintain until 7.5 total run time had elapsed. Pressure drop across the digester-reactor was less than 0.5 bar throughout the test, indicating a lack of plugging of the combination bed of ring catalyst and digesting wood particulates.

The digester-reactor assembly was cooled, depressured and drained of liquid. Undissolved solids were assessed via filtration, and drying via vacuum oven overnight at 90 degrees C. Results indicated digestion of 83% of the wood charged.

Liquid product formation (mono-oxygenates, glycols, diols, alkanes, acids) was measured via a gas chromatographic (GC) method "DB5-ox", entailing a 60-m×0.32 mm ID DB-5 column of 1 um thickness, with 50:1 split ratio, 2 ml/min helium flow, and column oven at 40 degrees C. for 8 minutes, followed by ramp to 285 degrees C. at 10 degrees C./min, and a hold time of 53.5 minutes. Injector temperature is set at 250 degrees C., and detector temperature at 300 degrees C.

Results indicated a yield of greater than 39% for conversion of nonvolatile carbohydrates of with boiling points higher than C6 sugar alcohol, to volatile monooxygenates, diols, polyols, and hydrocarbons of higher volatility, which can be processed to liquid fuels in a subsequent condensation—oligomerization step.

Particle density was measured by Mercury intrusion and void fractions were calculated using equation 1.

| Catalyst Name | DC-2534 Trilobe (1.3)* | OptiTrap HC hollow cylindar (3.2) |
|---|---|---|
| Sample weight (g) | 1.0009 | 0.9995 |
| Penetrometer assembly weight (g) | 57.6843 | 57.6843 |
| Penetrometer assembly weight + Hg (g) | 139.687 | 139.6868 |
| Penetrometer assembly weight + Hg + sample (g) | 129.9188 | 127.7797 |
| mercury density at 19.3° C. | 13.546 | 13.546 |
| pellet density | 1.258990203 | 1.049015775 |
| bulk density | 0.72 | 0.55 |
| Void fraction (1-bulk density/particle density) | 0.428113104 | 0.475699019 |

*DC-2534 Trilobe (1.3) catalyst was obtained from Criterion Catalyst & Technologies L.P.

Examples 2 and 3

Flow Permeability with Ring Catalyst in the Presence of Biomass Fines

The hollow ring catalyst from Example 1 was packed into a calibrated glass tube, which was filled with water to measure a void fraction of 42.5% of the total bed volume, as drainable volume. Water was flowed downward through the bed using a hydrostatic head of 300 mm of water, to assess initial bed flow permeability, yielding a linear velocity of 0.35 cm/sec. Bagasse milled to 1 mm after drying to 98% solids was charged at a loading of 3.2% relative to the mass of catalyst present. 9.5 bed volumes of water were passed downflow through the bed, driving the milled bagasse into the top 10% portion of the bed. Flow permeability in the presence of the retained bagasse remained at 62.5% of that measured prior to biomass introduction.

The experiment was repeated (Example 3) with 1/32-inch cylinders of alumina support (from Criterion Catalyst & Technologies L.P.), which packed with a voids fraction of only 28%. Liquid flow velocity using the same hydrostatic head of water as Example 2 was 0.23 cm/sec for the packed bed. Flow velocity was reduced to 0.04 cm/sec after introduction of bagasse to the top of the bed at 2.9 wt % relative to the mass of alumina charged, and flowing 8.6 bed volumes of water downflow through the bed. Water flow velocity through the bed in the presence of retained biomass fines was less than 18% of that observed before introduction of biomass particulates.

These examples show the ability of the hollow ring catalyst having a void fraction of 47% to maintain flow permeability despite deposition of biomass fines, whereby the flow permeability in the presence of biomass fines relative to the initial bed permeability was more than 3-fold greater for the ring catalyst, than for a similar bed packed with solid cylindrical catalyst containing no internal flow channels having a void fraction of 28%.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A lignocellulosic biomass conversion method comprising:
   (a) providing a solid biomass feedstock containing cellulose, lignin and water in a hydrothermal digestion unit;
   (b) heating the solid biomass feedstock in the hydrothermal digestion unit in the presence of a liquor to digest at least a portion of the solid biomass feedstock, thereby forming a hydrolysate comprising partially digested solids and soluble carbohydrates within a liquor phase;
   (c) contacting at least a portion of the hydrolysate, in one or more first fixed bed catalytic reduction reactor units, with molecular hydrogen at a temperature in the range of 180 degrees C. to less than 300 degrees C. in the presence of a supported metal catalyst capable of activating molecular hydrogen having an average void fraction of at least 40% and a surface area in the range of 10 $m^2/g$ to 1000 $m^2/g$, thereby at least partially transforming the hydrolysate into a reaction product comprising one or more alcohols in the liquor phase in the one or more first fixed bed catalytic reduction reactor units;
   (d) recirculating at least a portion of the liquor phase and at least a portion of the partially digested solids from the one or more first fixed bed catalytic reduction reactor units to the hydrothermal digestion unit; and
   (e) transferring at least a portion of the reaction product to a second catalytic reduction reactor unit so as to further transform the soluble carbohydrates into a reaction product.

2. The process of claim 1 wherein the first fixed bed catalytic reduction reactor unit is fluidly coupled to the hydrothermal digestion unit along its height by two or more fluid inlet lines and two or more fluid return lines, a fluid circulation loop comprising the hydrothermal digestion unit and a second catalytic reduction reactor unit wherein the second fluid inlet line is after the first fluid outlet line.

3. The process of claim 1 wherein the supported metal catalyst has an average void fraction of at least 45%.

4. The process of claim 3 wherein the supported metal catalyst has a surface area in the range of from 50 $m^2/g$ to 500 $m^2/g$.

5. The process of claim 1 wherein, in the first catalytic reduction reactor unit, the second catalytic reduction unit, or both contain a high void sulfided metal catalyst.

6. The process of claim 1 wherein, in the first catalytic reduction reactor unit, the second catalytic reduction unit, or both contain a metal catalyst on an inorganic support.

7. The process of claim 1 wherein the second catalytic reduction reactor unit contains a metal catalyst having an average void fraction in the range of 20% to 95% and a surface area in the range of 10 $m^2/g$ to 1000 $m^2/g$.

8. The process of claim 7 wherein the second catalytic reduction reactor unit contains a metal catalyst having an average void fraction in the range of 20% to less than 45%.

9. The process of claim 1 wherein the metal catalyst comprise at least one of Mo, W, Co, Ni, and any mixture thereof.

10. The process of claim 9 wherein the metal catalyst comprise (a) Mo or W, and (b) Co, Ni or any mixture thereof.

11. The process of claim 1 further comprising recirculating at least a portion of the liquor phase from the second catalytic reduction reactor unit to the hydrothermal digestion unit.

12. The process of claim 9 wherein the liquor phase is recirculated from the second catalytic reduction reactor unit to the hydrothermal digestion unit at a recycle ratio ranging between about 0.2 and about 10.

13. The process of claim 12 wherein the liquor phase is recirculated from the second catalytic reduction reactor unit to the hydrothermal digestion unit at a recycle ratio ranging between about 1 and about 2.

14. The process of claim 11 wherein the liquor phase is recirculated from the second catalytic reduction reactor unit to the hydrothermal digestion unit such that countercurrent flow is established in the hydrothermal digestion unit.

15. The process of claim 1 wherein at least about 90% of the cellulosic biomass solids, on a dry basis, are digested to produce hydrolysate.

16. The process of claim 1 wherein the liquor phase is recirculated between the hydrothermal digestion unit and the one or more first catalytic reduction reactor units at a recycle ratio ranging between about 1 and about 30.

17. The process of claim 1 further comprising converting the reaction product into a biofuel.

18. A lignocellulosic biomass conversion system comprising:
 a hydrothermal digestion unit;
 a first catalytic reduction reactor unit fluidly coupled to the hydrothermal digestion unit along its height by two or more fluid inlet lines and two or more fluid return lines, the first catalytic reduction reactor unit containing a supported metal catalyst capable of activating molecular hydrogen having a void fraction of at least 45% and a surface area in the range of 10 $m^2$/g to 1000 $m^2$/g; and
 a fluid circulation loop comprising the hydrothermal digestion unit and a second catalytic reduction reactor unit that contains a catalyst capable of activating molecular hydrogen.

19. The system of claim 18 wherein the supported metal catalyst comprises (a) Mo or W, and (b) Co and/or Ni.

20. A composition comprising:
 (i) lignocellulosic biomass;
 (ii) a supported metal catalyst having a avoid fraction in the range of from 45% to 95% and a surface area in the range of 10 $m^2$/g to 1000 $m^2$/g containing (a) Mo or W, and (b) Co, Ni or mixture thereof;
 (iii) water; and
 (iv) a liquor phase.

21. The composition of claim 20 wherein the supported metal catalyst further contains sulfur.

22. The composition of claim 20 wherein the supported metal catalyst contains a hollowed support.

* * * * *